United States Patent
Hara

(10) Patent No.: US 8,615,721 B2
(45) Date of Patent: Dec. 24, 2013

(54) INFORMATION DISPLAY SYSTEM, INFORMATION DISPLAY METHOD, AND COMPUTER PROGRAM PRODUCT

(75) Inventor: Junichi Hara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 949 days.

(21) Appl. No.: 12/314,834

(22) Filed: Dec. 17, 2008

(65) Prior Publication Data

US 2009/0164567 A1  Jun. 25, 2009

(30) Foreign Application Priority Data

Dec. 21, 2007 (JP) ................................. 2007-330256

(51) Int. Cl.
- *G06F 17/30* (2006.01)
- *G06F 3/0482* (2013.01)

(52) U.S. Cl.
CPC .............. *G06F 17/30* (2013.01); *G06F 3/0482* (2013.01)
USPC ........... 715/838; 715/810; 715/817; 715/819; 715/820; 715/834; 715/273; 382/305; 707/E17.029; 707/E17.008

(58) Field of Classification Search
USPC ......... 715/838, 273, 810, 817, 819, 820, 834; 382/305; 707/E17.008, E17.029
See application file for complete search history.

(56) References Cited

U.S. PATENT DOCUMENTS

| | | | |
|---|---|---|---|
| 6,121,970 A * | 9/2000 | Guedalia | 715/760 |
| 6,532,312 B1 * | 3/2003 | Corkran | 382/284 |
| 6,810,149 B1 * | 10/2004 | Squilla et al. | 382/224 |
| 6,850,911 B1 * | 2/2005 | Huether | 705/51 |
| 7,293,172 B2 | 11/2007 | Nishimura et al. | |
| 7,317,486 B2 * | 1/2008 | Toyofuku et al. | 348/333.11 |
| 7,327,347 B2 * | 2/2008 | Hilbert et al. | 345/156 |
| 7,336,775 B2 * | 2/2008 | Tanaka et al. | 379/93.17 |
| 7,336,852 B2 | 2/2008 | Nomizu et al. | |
| 7,339,557 B2 * | 3/2008 | Ochi | 345/63 |
| 7,352,907 B2 | 4/2008 | Sakuyama et al. | |
| 7,352,910 B2 * | 4/2008 | Kanamori et al. | 382/254 |
| 7,386,175 B2 | 6/2008 | Hara et al. | |
| 7,394,470 B2 | 7/2008 | Nishimura et al. | |

(Continued)

FOREIGN PATENT DOCUMENTS

| CN | 1929544 | 3/2007 |
|---|---|---|
| JP | 2004-206697 | 7/2004 |

(Continued)

OTHER PUBLICATIONS

Chinese Office Action dated Nov. 9, 2010 and English translation thereof.

(Continued)

*Primary Examiner* — Ece Hur

(74) *Attorney, Agent, or Firm* — Harness, Dickey & Pierce, P.L.C.

(57) ABSTRACT

A thumbnail image generating unit generates thumbnail images from a plurality of images having a sequential relation. A thumbnail image displaying unit displays the thumbnail images generated according to the sequential relation. A thumbnail image designating unit receives a designation of a thumbnail image from among the thumbnail images. An enlarging unit generates an enlarged image of a designated thumbnail image. An enlarged image displaying unit displays the enlarged image. A forward-advance designating unit designates a forward advance of the enlarged image displayed by the enlarged image displaying unit according to the sequential relation.

16 Claims, 20 Drawing Sheets

(56) References Cited

U.S. PATENT DOCUMENTS

| | | | |
|---|---|---|---|
| 7,409,060 B2 | 8/2008 | Nomizu et al. | |
| 7,437,005 B2* | 10/2008 | Drucker et al. | 382/224 |
| 7,450,773 B2 | 11/2008 | Nomizu et al. | |
| 7,603,383 B2* | 10/2009 | Ishikawa | 1/1 |
| 7,634,502 B2* | 12/2009 | Colton et al. | 1/1 |
| 7,660,476 B2* | 2/2010 | Ishikawa | 382/240 |
| 7,663,643 B2* | 2/2010 | Shiota et al. | 345/619 |
| 7,675,514 B2* | 3/2010 | Ni et al. | 345/419 |
| 7,908,558 B2* | 3/2011 | Obrador et al. | 715/730 |
| 7,986,324 B2* | 7/2011 | Funaki et al. | 345/440 |
| 8,032,840 B2* | 10/2011 | Haro et al. | 715/838 |
| 8,108,342 B2* | 1/2012 | Salinas et al. | 707/621 |
| 8,190,326 B2* | 5/2012 | Nezu et al. | 701/36 |
| 2002/0025084 A1* | 2/2002 | Yang et al. | 382/299 |
| 2003/0081011 A1 | 5/2003 | Sheldon et al. | |
| 2003/0101234 A1* | 5/2003 | McBrearty et al. | 709/218 |
| 2003/0210262 A1* | 11/2003 | Gahm et al. | 345/732 |
| 2004/0064834 A1 | 4/2004 | Kuwata et al. | |
| 2004/0134978 A1 | 7/2004 | Hara et al. | |
| 2004/0151386 A1 | 8/2004 | Kodama et al. | |
| 2004/0169665 A1* | 9/2004 | Sakashita et al. | 345/629 |
| 2004/0190782 A1 | 9/2004 | Nomizu et al. | |
| 2004/0202371 A1 | 10/2004 | Kodama et al. | |
| 2004/0205627 A1 | 10/2004 | Rosenholtz et al. | |
| 2004/0208379 A1 | 10/2004 | Kodama et al. | |
| 2004/0218817 A1 | 11/2004 | Kodama et al. | |
| 2004/0246360 A1* | 12/2004 | Stavely et al. | 348/333.11 |
| 2004/0252897 A1 | 12/2004 | Hara et al. | |
| 2004/0258304 A1* | 12/2004 | Shiota et al. | 382/170 |
| 2005/0036701 A1 | 2/2005 | Miyazawa et al. | |
| 2005/0053239 A1 | 3/2005 | Nomizu et al. | |
| 2005/0091596 A1* | 4/2005 | Anthony et al. | 715/712 |
| 2005/0120307 A1* | 6/2005 | Suzuki | 715/765 |
| 2005/0192924 A1* | 9/2005 | Drucker et al. | 707/1 |
| 2005/0201624 A1 | 9/2005 | Hara et al. | |
| 2006/0020895 A1* | 1/2006 | Keohane et al. | 715/732 |
| 2006/0053157 A1* | 3/2006 | Pitts | 707/102 |
| 2006/0093309 A1* | 5/2006 | Herberger et al. | 386/46 |
| 2006/0140494 A1* | 6/2006 | Ishikawa | 382/239 |
| 2006/0146122 A1* | 7/2006 | McDonald et al. | 348/14.03 |
| 2006/0167940 A1* | 7/2006 | Colton et al. | 707/104.1 |
| 2006/0228033 A1 | 10/2006 | Hara | |
| 2006/0274060 A1* | 12/2006 | Ni et al. | 345/419 |
| 2007/0058872 A1 | 3/2007 | Jang et al. | |
| 2007/0081813 A1* | 4/2007 | Hong et al. | 396/310 |
| 2007/0101387 A1* | 5/2007 | Hua et al. | 725/113 |
| 2007/0162953 A1* | 7/2007 | Bolliger et al. | 725/142 |
| 2008/0059903 A1* | 3/2008 | Kaminaga et al. | 715/797 |
| 2009/0064029 A1* | 3/2009 | Corkran et al. | 715/781 |
| 2009/0119585 A1* | 5/2009 | Sakuyama et al. | 715/273 |
| 2009/0189913 A1* | 7/2009 | Moody et al. | 345/619 |

FOREIGN PATENT DOCUMENTS

| | | |
|---|---|---|
| JP | 2004-258838 | 9/2004 |
| JP | 2005-275738 | 10/2005 |
| JP | 2006-304012 | 11/2006 |
| JP | 2007-286864 | 1/2007 |

OTHER PUBLICATIONS

Drucker, Steven M. et al., "MediaBrowser: Reclaiming the Shoebox", May 25, 2004, pp. 433-436, XP002491964.

European search report dated Mar. 10, 2009, for counterpart Application No. 08170938.8.

Japanese Office Action dated May 15, 2012, issued for corresponding Application No. JP 2007-330256.

* cited by examiner

| THUMBNAIL NAME | SIZE OF LONG SIDE |
|---|---|
| Sam1 | 40 |
| Sam2 | 80 |
| Sam3 | 160 |
| Sam4 | 320 |
| Sam5 | 640 |
| Sam6 | 1280 |
| Sam7 | 2560 |
| Sam8 | 5120 |

INFORMATION DISPLAY SYSTEM, INFORMATION DISPLAY METHOD, AND COMPUTER PROGRAM PRODUCT

CROSS-REFERENCE TO RELATED APPLICATIONS

The present application claims priority to and incorporates by reference the entire contents of Japanese priority document 2007-330256 filed in Japan on Dec. 21, 2007.

BACKGROUND OF THE INVENTION

1. Field of the Invention

The present invention relates to an information display system, an information display method, and a computer program product.

2. Description of the Related Art

Electronic filing devices are known in the art that digitalizes paper documents using a scanner. In recent years, ease-of-handling and convenience of such devices have been receiving recognition in the common offices because of availability of low-cost scanners, popularity of multifunction products (MFPs) providing a scanning function, and legislation of the e-Document Law. As a result, instances in which paper documents are scanned and digitalized are increasing. Uses for image databases (DB) are also increasing. An image DB organizes digitalized document image data and photographic image data, as well as document data created using a personal computer (PC) application and the like, in a DB and collectively manages the pieces of data. Even when, for example, an original copy of a paper document is required to be stored, an image DB may be constructed because the image DB facilitates data management and retrieval.

Various image DB are constructed, ranging from a large-scale DB provided in a server device and accessed by a large number of people to a personal-use DB constructed within an individual PC. MFP of recent years include a function for storing documents in an internal hard disk drive (HDD). In some instances, the image DB is constructed based on the MFP.

To view an image within an image DB storing therein a plurality of images, a user retrieves the image to be viewed using an image retrieval method. In other words, when the user knows an image name (file name) of an image to be retrieved, the image is retrieved from a list of image names. However, a displayed thumbnail list is commonly used. For example, when a document image is retrieved, a keyword search is performed and a thumbnail list of candidate images matching the keyword is displayed. The user then selects the image to be retrieved from the thumbnail list. Alternatively, only a thumbnail list of images is displayed from the start, and the user selects the image to be retrieved from the thumbnail list.

A thumbnail list is a cluster of a plurality of minified images displayed in a certain manner on a screen. The user can easily understand contents of the original images from the minified images. In general, the resolution of the thumbnail images in the thumbnail list is reduced to allow simultaneous display of many thumbnail images in a limited area. When a photographic image is displayed in the thumbnail list, the user can understand a content of the photographic image with relative ease, even when the resolution of the thumbnail image is reduced. However, when the image to be displayed is a document image that is mainly text, the user has difficulty reading the text and understanding a content of the document image because the resolution of the thumbnail image is reduced. Therefore, when the user retrieves a document image such as this, the user is often required to display an enlarged view of each document image using a function, such as a viewer, to check the content of the document image. Operability during retrieval is extremely poor. Moreover, particularly in a client-server system using a network, high-resolution image data is required to be newly transferred whenever the user displays an image using the viewer. As a result, a large amount of processing time is required when the user checks a large number of images. Retrieval efficiency deteriorates significantly.

More processing time is required if a large number of thumbnail images are to be displayed in the thumbnail list. Therefore, particularly in the client-server system using the network, waiting time required until the thumbnail images are displayed is shortened by a number of thumbnail images simultaneously displayed in the thumbnail list being reduced. A screen displaying the thumbnail list is changed in a manner similar to that of turning a page. However, because only a small number of thumbnail images can be displayed on one screen, the user is required to turn the page (change the screen) many times. Moreover, the user cannot easily understand the whole aspect of the listed thumbnail images. Therefore, it is not rare for the user to be unable to find a desired image even after viewing all of the pages. As a result, retrieval efficiency further deteriorates.

When the images stored in the image DB are displayed in the thumbnail list, the thumbnail images are not dynamically created from original images stored in the image DB nor is original image data used as is every time the thumbnail list is displayed, namely every time a thumbnail list display screen is created. In general, the thumbnail images that are minified versions of the original images are stored (collected) in the image DB in advance, and the stored thumbnail images are used. Using the stored thumbnail images is advantageous in terms of processing speed. For example, when the thumbnail list display screen is created using HyperText Markup Language (HTML) and the like in the client-server system, the server does not ordinarily create a display screen in bitmap format. The server only creates an HTML document including links to image (file) names to be displayed. The client renders the HTML document using browser software and generates a bitmap-format display screen. In this case, the server is required to transfer all thumbnail images displayed on the display screen to the client, regardless of the image size of the thumbnail images on the display screen (ordinarily specified by the server). Ordinarily, all images are transferred even when some of the images run over an edge of the display screen. Therefore, when the number of thumbnail images displayed on a one screen increases, volume of data required to be transferred also increases. Moreover, because a small volume of data is transferred many times, data transfer efficiency decreases, requiring time for the screen to be displayed on the client end. A packet length during data transfer is ordinarily fixed. Different files are not included in a single packet. Therefore, when small files are transferred, redundant transfer data is generated. When the number of small files to be transferred increases, the pieces of redundant transfer data become difficult to ignore. As a result, transfer efficiency deteriorates. Generally, when the number of thumbnail images to be displayed increases, load placed on the server, such as that involving disk access, also increases.

To solve the above-described problems, a retrieval method in Japanese Patent Application Laid-open No. 2004-25883.8 has been proposed. In the retrieval method, a desired piece of information can be retrieved through a simple operation including a map displaying procedure and a detailed thumbnail displaying procedure. In other words, thumbnail images are disposed on a two-dimensional map, and the thumbnail images are displayed. When a user specifies a point within a certain small area, among a plurality of small areas into which the map is divided, a group of small areas centering around the specified small area is designated as an area to be enlarged. The thumbnail images disposed within the area to be enlarged are enlarged. Contents of the thumbnail images are displayed in detail.

However, in the method in Japanese Patent Application Laid-open No. 2004-258838, a binary display switching is performed that switches between a thumbnail display and a detailed display. Therefore, when the user does not know a position of the image to be retrieved on the map in the thumbnail display, the user may be required to switch to the enlarged display and search thoroughly for the image to be retrieved. Magnification may also be insufficient in the enlarged display. When the number of thumbnail images displayed on the map during the thumbnail display increases, the image size of the thumbnail images decreases because the thumbnail images cannot be displayed so as to overlap. The thumbnail list may become incomprehensible. Moreover, when the number of thumbnail images displayed on the map increases, time may be required to display the images, as described above.

SUMMARY OF THE INVENTION

It is an object of the present invention to at least partially solve the problems in the conventional technology.

According to one aspect of the present invention, there is provided an information display system including a thumbnail image generating unit that generates thumbnail images from a plurality of images having a sequential relation; a thumbnail image displaying unit that displays the thumbnail images generated according to the sequential relation; a designating unit that receives a designation of a thumbnail image from among the thumbnail images; an enlarging unit that generates an enlarged image of a designated thumbnail image; an enlarged image displaying unit that displays the enlarged image; and a forward-advance designating unit that designates a forward advance of the enlarged image displayed by the enlarged image displaying unit according to the sequential relation. The designating unit takes a thumbnail image required to be enlarge as a result of a designation of the forward advance according to the sequential relation by the forward-advance designating unit as a designated thumbnail image.

Furthermore, according to another aspect of the present invention, there is provided a method of displaying information in an information display system. The method includes thumbnail image generating including generating thumbnail images from a plurality of images having a sequential relation; thumbnail image displaying including displaying the thumbnail images generated according to the sequential relation; thumbnail image designating including receiving a designation of a thumbnail image from among the thumbnail images; enlarging including generating an enlarged image of a designated thumbnail image; enlarged image displaying including displaying the enlarged image; and forward-advance designating including designating a forward advance of the enlarged image displayed at the enlarged image displaying according to the sequential relation. The thumbnail image designating further includes taking a thumbnail image required to be enlarge enlarged as a result of a designation of the forward advance according to the sequential relation at the forward-advance designating as a designated thumbnail image.

Moreover, according to still another aspect of the present invention, there is provided a computer program product including a computer-usable medium having computer-readable program codes embodied in the medium. The program codes when executed cause a computer to execute thumbnail image generating including generating thumbnail images from a plurality of images having a sequential relation; thumbnail image displaying including displaying the thumbnail images generated according to the sequential relation; thumbnail image designating including receiving a designation of a thumbnail image from among the thumbnail images; enlarging including generating an enlarged image of a designated thumbnail image; enlarged image displaying including displaying the enlarged image; and forward-advance designating including designating a forward advance of the enlarged image displayed at the enlarged image displaying according to the sequential relation. The thumbnail image designating further includes taking a thumbnail image required to be enlarge as a result of a designation of the forward advance according to the sequential relation at the forward-advance designating as a designated thumbnail image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11A is a diagram of an enlarged image generated using a conventional method;

FIG. 11B is a diagram of an enlarged image generated using a method of the present invention;

DETAILED DESCRIPTION OF THE PREFERRED EMBODIMENTS

Exemplary embodiments of the present invention are described in detail below with reference to the accompanying drawings.

A first embodiment of the present invention will be described with reference to FIGS. 1 to 7. According to the first embodiment, an example is described in which a client-server system is used as an information display system.

Figure 1:
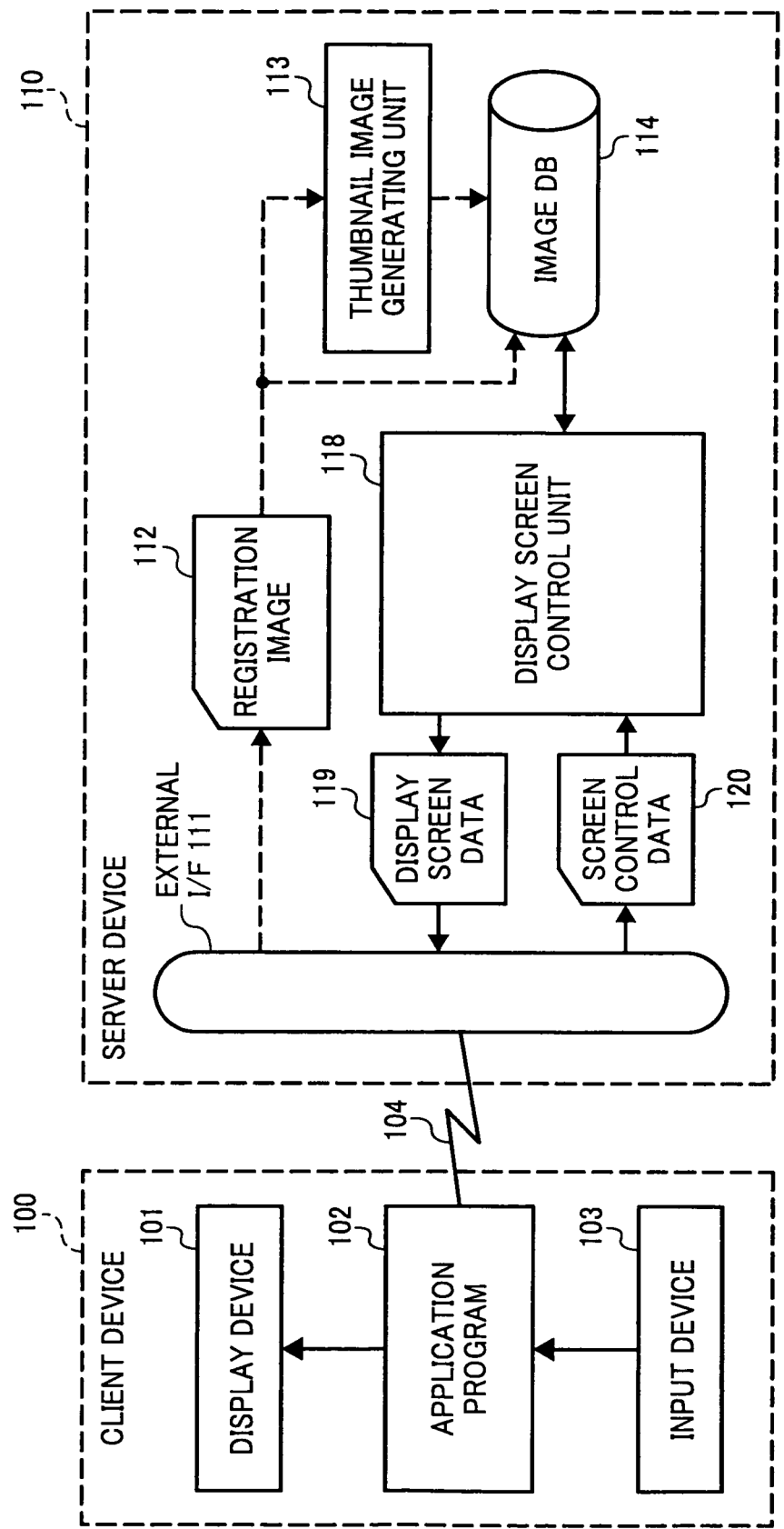
FIG. 1 is a block diagram of a configuration of a client-server system according to a first embodiment of the present invention.

FIG. 1 is a block diagram of a configuration of a client-server system according to the first embodiment of the present invention. In the client-server system according to the first embodiment, a client device 100 and a server device 110 are connected by an external communication path 104. The client device 100 is, for example, a personal computer (PC) or a mobile terminal, such as a personal digital assistant (PDA) or a mobile phone. The server device 110 performs image classification based on a command from the client device 100 and outputs classification results to the client device 100. The external communication path 104 is, for example, a local area network (LAN) or the Internet.

The client device 100 includes a display device 101, an application program 102, and an input device 103. The display device 101 is, for example, a monitor. The input device 103 is, for example, a keyboard or a mouse serving as an instruction input unit by which a user enters an instruction. The application program 102 interprets the instruction entered by the user, communicates with the server device 110, and controls the display device 101.

The server device 110 includes an external interface (I/F) 111, a thumbnail image generating unit 113, an image DB 114, and a display screen control unit 118. The external I/F 111 interfaces the server device 110 with the external communication path 104. The thumbnail image generating unit 113 changes magnification of registration images 112 to a predetermined size or smaller and generates a plurality of thumbnail images. The registration images 112 are sequentially correlated in order in which the registration images 112 are registered to the image DB 114. The image DB 114 stores therein image data of the registration images 112 and thumbnail image data. The display screen control unit 118 generates display screen data 119 that is displayed in the display device 101 of the client device 100. The display screen control unit 118 also controls a display screen based on a content of screen control data 120 from the client device 100. The client device 100 specifies the screen control data 120. Dotted lines in FIG. 1 indicate data flow during image registration. Solid lines indicate data flow when a thumbnail list display screen is created.

The sequentially correlated registration images 112 are, for example, page images of a document, slide images, sequence images of a moving image, and sequence images in order in which the images are picked up by a digital camera or the like.

Figure 2:
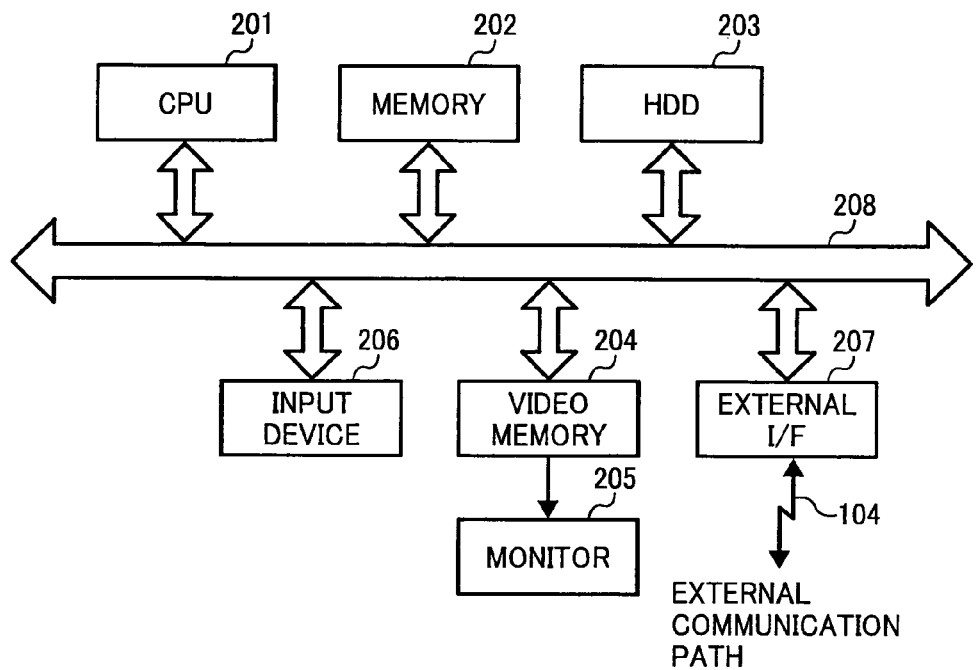
FIG. 2 is a block diagram of a configuration of a server device and a client device.

FIG. 2 is a block diagram of a configuration of the server device 110 and the client device 100. A reference number 201 indicates a central processing unit (CPU) that performs calculations and realizes processes based on computer programs. A reference number 202 indicates a volatile memory used as a work area that temporarily stores therein data, such as computer program codes and encoded image data. A reference number 203 indicates a hard disk drive (HDD) that stores therein image data, computer programs, and the like. The HDD 203 also stores therein the image DB 114. A reference number 204 indicates a video memory serving as a data buffer for pieces of data to be displayed on a monitor 205. Image data written in the video memory 204 is periodically displayed on the monitor 205. A reference number 206 indicates an input device, such as a mouse or a keyboard. A reference number 207 indicates an external I/F that transmits and receives data using the external communication path 104. The external communication path 104 is, for example, the Internet or a LAN. A reference number 208 indicates a bus that connects each constituent element.

According to the first embodiment, an example is described in which the server device 110 is configured by a PC and actualizes processes, such as generating a display screen, using software. In other words, processes performed within the server device 110 are realized by application programs (not shown). However, the present invention is not limited to the first embodiment. The present invention can be configured such that processes are performed using hardware within a device, such as an MFP. Alternatively, the configuration shown in FIG. 1 can be configured, for example, within a single PC or a device such as the MFP, without using a client-server configuration.

An overview of operations according to the first embodiment will be described. In the system according to the first embodiment, the operations are largely separated into two operations. One operation performs image registration. Another operation "uses images in the image DB 114" by retrieving, viewing, and acquiring (downloading from the server device 110) a desired image. When the images in the image DB 114 are used, first, a desired image is retrieved. The retrieved desired image is then stored in the client device 100 used by the user. Techniques, such as keyword search and similar-image search, are used to perform image retrieval. However, to simplify explanation, according to the first embodiment, an operation for retrieving the image to be retrieved from a thumbnail list, performed after the keyword search, the similar-image search, and the like, will be described as a retrieval process. In some instances, processes, such as the keyword search, the similar-image search, are not performed, and the desired image is retrieved from only the thumbnail list.

In the operation for image registration, thumbnail images used in the displayed thumbnail list are created from consecutive sequence images to be registered. The sequence images are, for example, a series of page images of a book or frame images of a moving image. Display images used for browsing page contents are also created. A process for displaying a retrieval result performed during an operation for retrieving an image from the displayed thumbnail list will be described according to the first embodiment.

Figure 3:
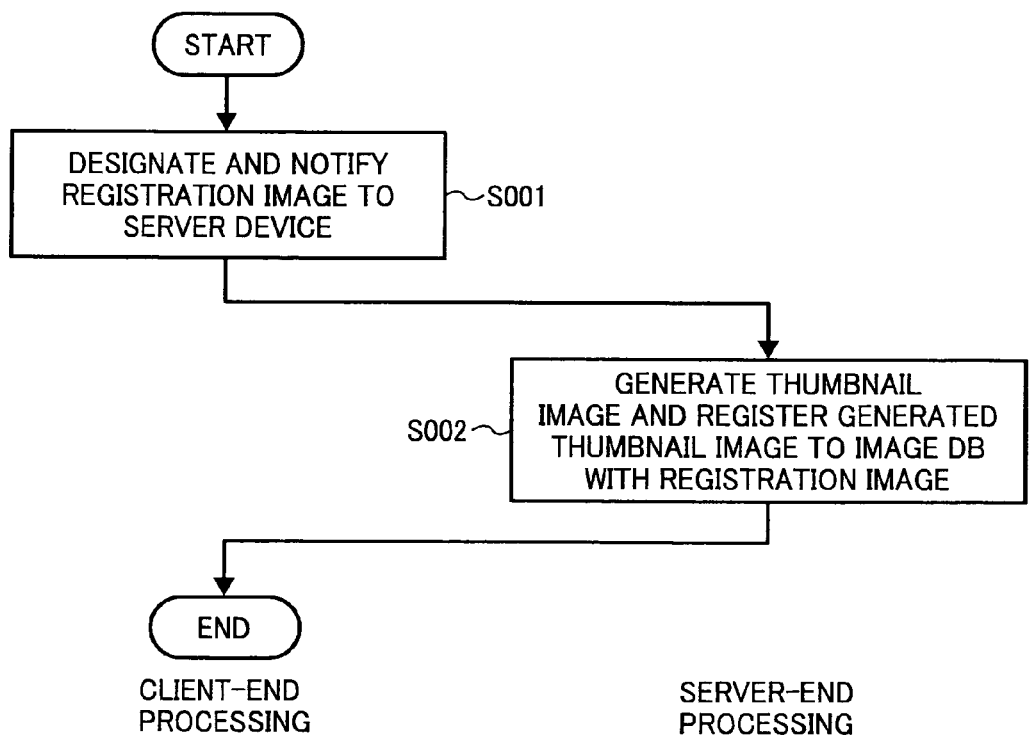
FIG. 3 is a flowchart of an image registration process.

First, an overview of the operation for image registration will be described with reference to the block diagram in FIG. 1 (dotted lines indicate the operation during image registration) and a flowchart in FIG. 3.

At Step S001, the user instructs the server device 110 to register image data. The user issues the instruction from the client device 100 using the application program 102. The user also designates the registration image 112 to be registered.

At Step S002, the registration image 112 is input into the server device 110, via the external communication path 104. An identifier (ID) and associated meta information, such as a file name, are added to the registration image 112, and the registration image 112 is registered to the image DB 114 via the external I/F 111. At the same time, the thumbnail image generating unit 113 generates a "thumbnail image" of a predetermined size or smaller by performing a reducing process on the registration image 112. The thumbnail image generating unit 113 then adds an ID to the thumbnail image and registers the thumbnail image to the image DB 114. The thumbnail image generating unit 113 serves as a thumbnail image generating unit. When the registration image 112 includes a plurality of pages, a thumbnail image is generated in page units. An external source provides classification information of the registration image 112. The classification information is registered to the image DB 114 in correspondence with the ID. The classification information from the external source can be any piece of information categorizing the registration image 112. For example, the classification information can include meta data associated with the registration image 112 (such as a date and time of creation, a creator, software used to create the registration image 112, an image type, a user comment, or a keyword). Alternatively, the classification information can include information present within the registration image 112 (such as categorization based on color and shape, categorization based on statistical properties, or categorization based on repetitive learning). The classification information can also include information obtained from new discoveries. Here, a classifying unit is realized.

According to the first embodiment, a thumbnail image is generated for each registration image in one size, for each group of sequence images. A method of generating the thumbnail image is, for example, as follows. A size of a long side is prescribed for each thumbnail image of a different size. When the size of the long side of an original image of the registration image 112 is greater than the prescribed size, the registration image 112 is reduced, thereby creating a thumbnail image having a long side with the prescribed length. A short side of the registration image 112 is reduced in proportion with the long side.

The pieces of associated meta information, such as ID and file names, in the image DB 114 can be easily processed or, in other words, registered, managed, retrieved, and the like, through use of a common relational database (RDB). Pieces of thumbnail image data and original image data can be stored after being compressed and encoded as required. The pieces of meta information can include links to the stored pieces of thumbnail image data and original image data, allowing the pieces of thumbnail image data and original image data to be read. If the image DB 114 provides the above-described function, a hierarchical data structure can be established using a language, such as extensible Markup Language (XML). The pieces of thumbnail image data and original image data can be stored in the established hierarchical data structure. Alternatively, different servers can individually store the pieces of thumbnail image data and original image data as separate DB.

Image data can also be directly registered to the server device 110 from an image input device, such as a scanner or a digital camera.

Figure 4:
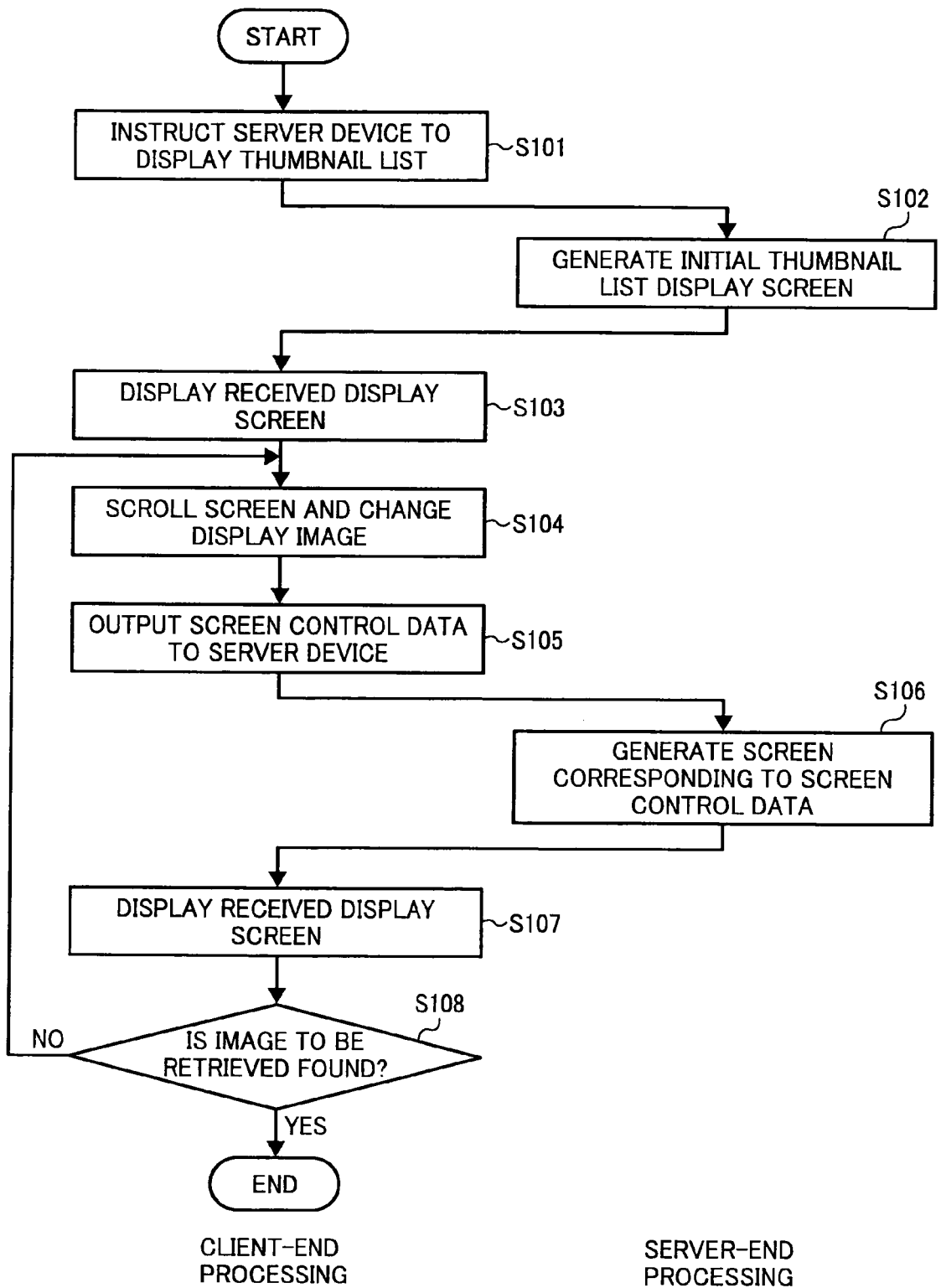
FIG. 4 is a flowchart of an image retrieval process.

Next, an overview of an operation for image retrieval will be described with reference to the block diagram in FIG. 1 and a flowchart in FIG. 4.

In Step S101, the user instructs the server device 110 to display a thumbnail list. The user issues the instruction from the client device 100 using the application program 102.

Figure 5:
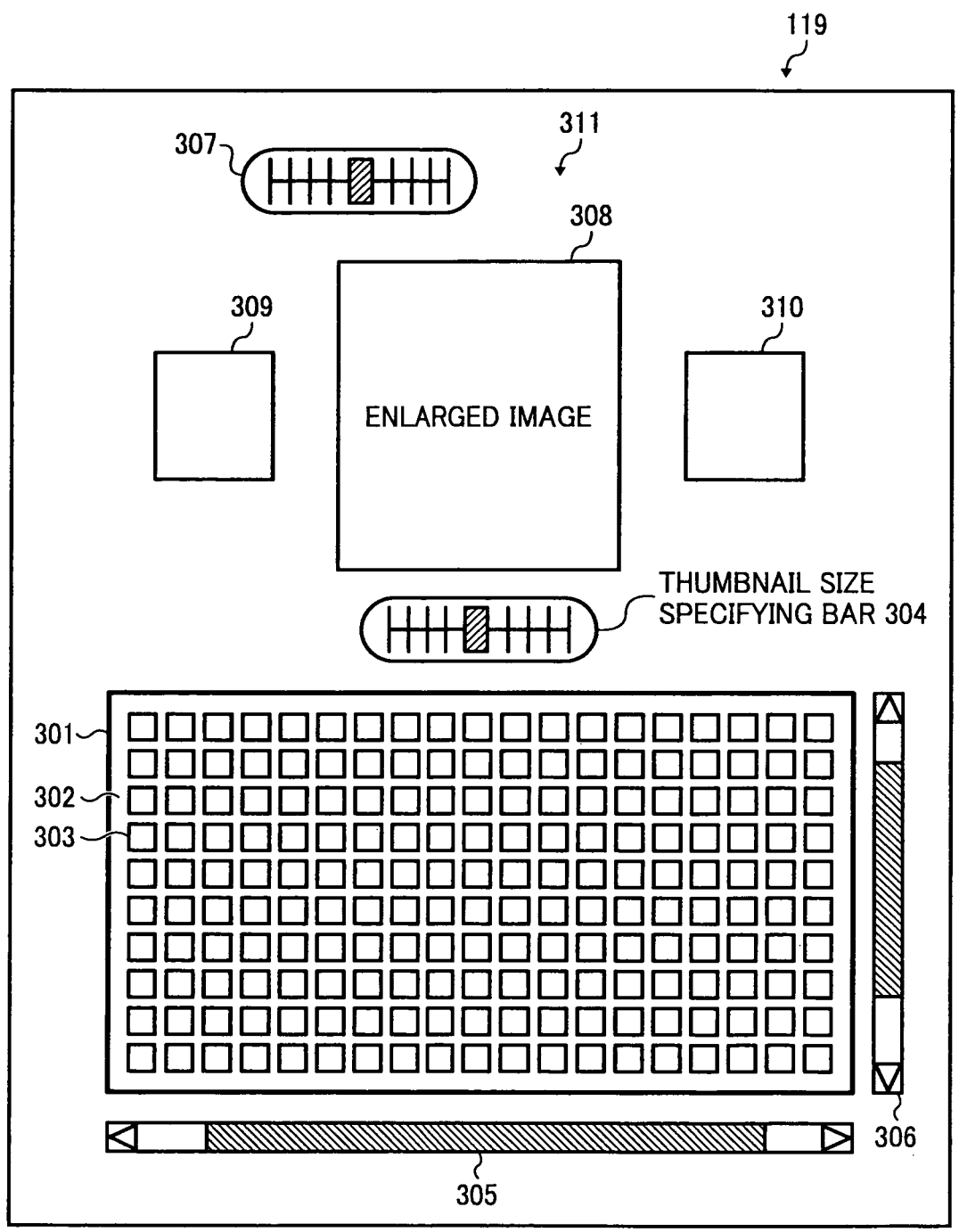
FIG. 5 is a front view of a thumbnail list display screen.

At Step S102, when the server device 110 receives the instruction to display the thumbnail list, the display screen control unit 118 generates an initial thumbnail list display screen, shown in FIG. 5 (thumbnail image displaying unit). FIG. 5 is a front view of an example of the thumbnail list display screen. The thumbnail list display screen according to the first embodiment largely has a two-screen structure. One screen is a thumbnail list view 302. Another screen is a selected image display view 311 displaying an enlarged thumbnail image, in which an enlarging unit and an enlarged image displaying unit are realized. The application program 102 within the client device 100 combines the two screens and generates a display screen for the display device 101, thereby creating the screen shown in FIG. 5.

In FIG. 5, a reference number 301 indicates a window restricting a display area of the thumbnail list view 302. The reference number 302 indicates the thumbnail list view that is a display frame for the thumbnail images. A reference number 303 indicates individual thumbnail images (each square represents a thumbnail image). A reference number 304 is a slider used to set a display magnification of the thumbnail list view 302. A reference number 305 indicates a slider used to scroll the thumbnail list view 302 in a horizontal direction. A reference number 306 indicates a slider used to scroll the thumbnail list view 302 in a vertical direction. The reference number 311 is the selected image display view. A reference number 308 indicates a window configuring the selected image display view 311 and displays a currently selected image. A reference number 309 indicates a window configuring the selected image display view 311 and displays an image immediately preceding the currently selected image in the thumbnail list. A reference number 310 indicates a window configuring the selected image display view 311 and displays an image immediately following the currently selected image in the thumbnail list. A reference number 307 indicates a slider used to designate movement of an image to the selected image display view 311 to be displayed.

Figure 6:
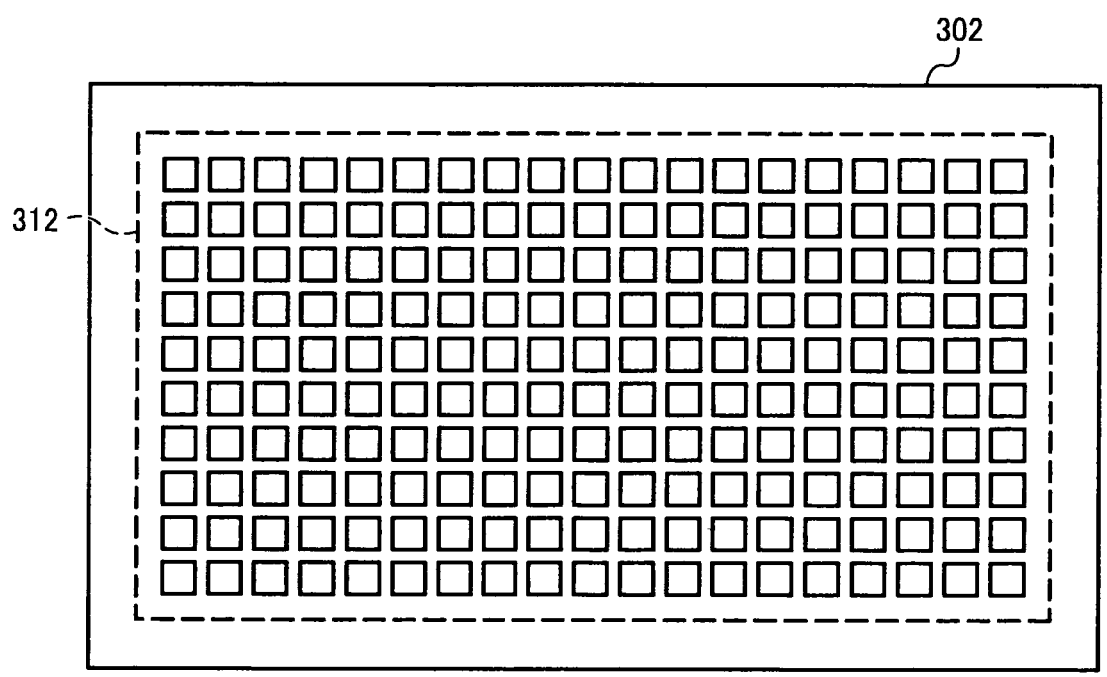
FIG. 6 is a front view of a thumbnail list view.

FIG. 6 is a front view of the thumbnail list view 302. A reference number 312 indicates a display area representing boundaries of the window 301 that restricts the display area of the thumbnail list view 302.

The display screen control unit 118 generates the two types of display screens, described above. In an outer frame section of the display screens, merely the display magnification of the thumbnail list view 302 and positions of the slider 305 and the slider 306 for scrolling the display area are changed. Therefore, a description of the outer frame section is omitted. An operation for generating a screen for the thumbnail list view 302 will be described in detail.

When the display screen control unit 118 generates the initial thumbnail list display screen, the display screen control unit 118 generates the thumbnail list view 302 by setting the display magnification of the thumbnail list view 302 and the display area 312 to predetermined values. The display screen control unit 118 then transmits the generated thumbnail list view 302 and the outer frame section to the client device 100 as the display screen data 119, using the external I/F 111 and the external communication path 104.

The thumbnail list view 302 is configured having a screen as shown in FIG. 6. However, the display screen control unit 118 is not required to hold an image of the screen. The display screen control unit 118 is merely required to hold positional information (coordinate information) and ID information of each display image. Regarding the thumbnail list view 302, the server device 110 transmits only the screen within the display area 312 to the client device 100. The thumbnail images displayed within the thumbnail list view 302 are displayed such that thumbnail images belonging to a same category are clearly indicated based on display parameters transmitted from the server device 110. For example, the thumbnail images belonging to the same category are displayed being framed with a same color or having a trimming. For example, as described above, the user registers the classification information of the images used for categorization to the server device 110 in advance with registration information of the images.

Various methods can be used to generate the display screen as described as above. Various methods can also be used for communication between the server and the client. A commonly used method uses a World Wide Web (WWW)-based technology in which the server device 110 is a web server. The display screen data 119 is written in HTML. A common web browser is used as the application program 102. According to the first embodiment, the slider 304, the slider 305, the slider 306, and the slider 307 used to scroll to change the display magnification and the display area are included within the display screen. However, the input device 103, such as a mouse, of the client device 100 can provide the functions of the slider 304, the slider 305, the slider 306, and the slider 307.

Returning to FIG. 4, at Step S103, the client device 100 uses the application program 102 to render the display screen data 119 and display the display screen data 119 in the display device 101.

At Step S104, the user using the client device 100 views the display screen data 119. The user gives an instruction to scroll the display screen to search for the image to be retrieved by operating the slider 305 and the slider 306 that are used to change the display area. The user operates the sliders 305 and 306 using the input device 103, such as the mouse.

At Step S105, instructions to scroll the screen and to change the display magnification are converted to display magnification data and display area data. The display magnification data and display area data form the screen control data 120. The screen control data 120 is then transmitted to the server device 110.

At Step S106, the server device 110 receives the screen control data 120 and extracts an image for selected image display. The server device 110 then returns the extracted image to the client device 100. At this time, rather than extracting the image, the server device 110 can generate a piece of image data to be returned from the original image.

At Step S107, in a manner similar to that at Step S103, the display screen data 119 that has been changed is displayed on the display device 101.

When the user cannot find the image to be retrieved at Step S108, procedures performed at Steps S104 to S107 are repeated.

FIGS. 7A to 7D are front views of changes made in the display image when the user uses the slider 307 in the selected image display view 311 displayed in the display device 101 of the client device 100, according to the first embodiment. In the example shown in FIGS. 7A to 7D, pages of a document image are turned and displayed. "B" is displayed in the window 308 displaying a first page of interest. "A" is displayed in the window 309 displaying a previous page. "C" is displayed in the window 310 displaying a following page (see FIG. 7A). "D", "E", "F", and so on successively appear after "C". In this state, it is assumed that the user wishes to find "F". It is also assumed that "B", "E", and "F" are classified into a same page category. In this case, "B", "E", and "F" are clearly indicated in the list of thumbnail images 303 displayed in the thumbnail list view 302 by being framed with a same color, page framework, or the like. "B", "E", and "F" are displayed so that it is evident at a glance that "B", "E", and "F" belong to the same category.

In this way, the thumbnail images are classified using the classification information of the images provided from the external source. The thumbnail images are displayed such that the classifications of the thumbnail images can be identified. As a result, even when an extremely large number of thumbnail images are present, a sample image to be enlarged first can be quickly identified. Therefore, thumbnail images of a size smaller than that ordinarily used can be used. Transfer time in this instance can be reduced, and productivity can be improved.

Figure 7A:
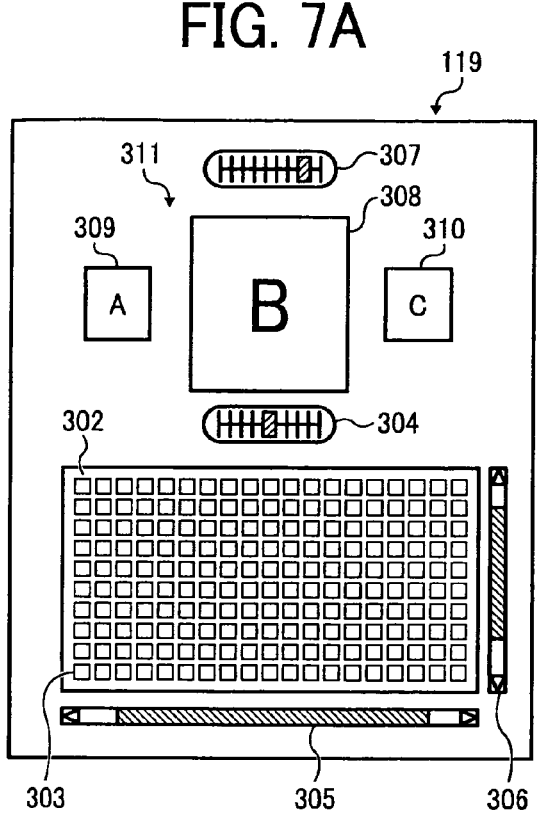
FIGS. 7A to 7D are front views of changes in a display image.
Figure 7B:
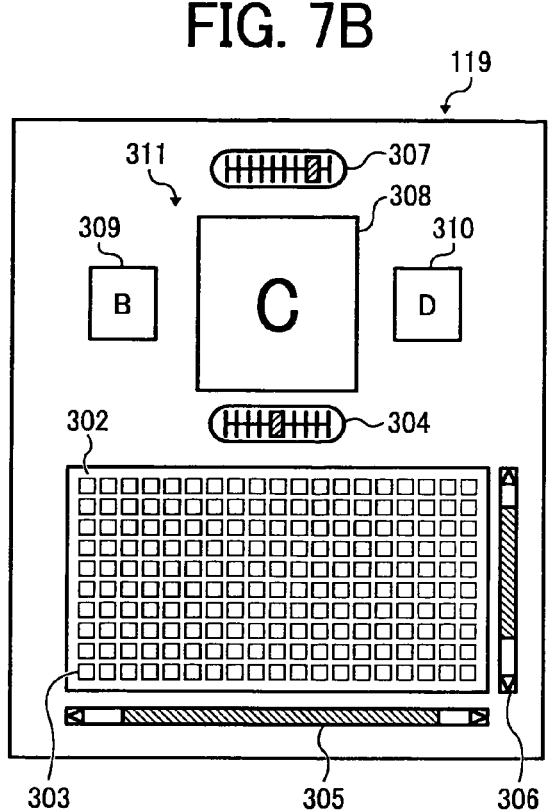
Figure 7C:
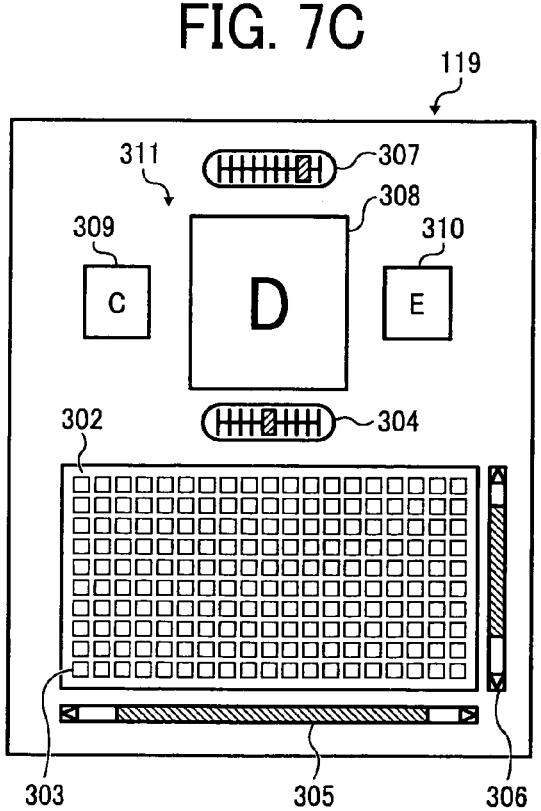

The user uses the input device 103, such as the mouse, and selects the thumbnail image "B" that is a first page belonging to the same category as "F" to display a candidate image of the image to be retrieved from the thumbnail images 303 displayed in the thumbnail list view 302. The thumbnail image "B" is displayed in the window 308 at the center of the selected image display view 311 (see FIG. 7A) (designating unit) The user then uses the slider 307 to change the image displayed in the window 308 that is the enlarged image display area to "C", "D", and so on (forward-advance designating unit). The user checks whether the image in the window 308 is the image to be retrieved "F" (FIGS. 7B to 7D).

Figure 7D:
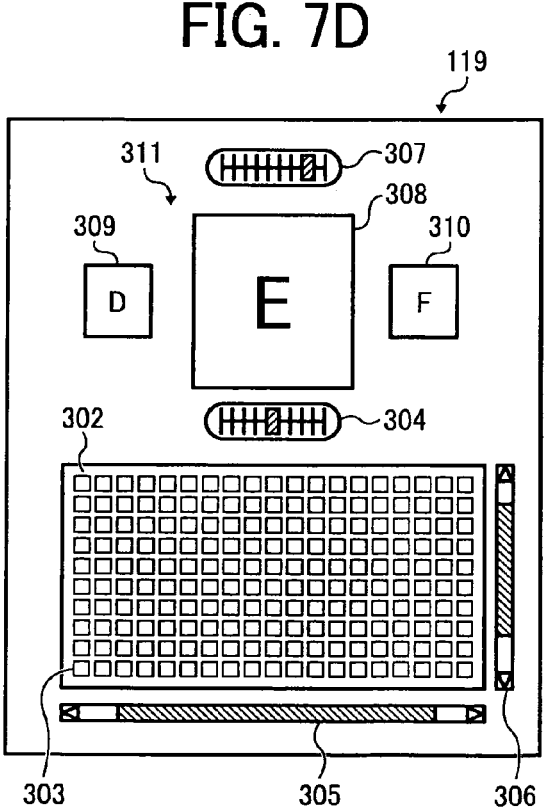

As shown in FIG. 7D, when the page "E" is displayed in the window 308, the user can confirm that the following page displayed in the window 310 is "F". In other words, the following page is the image to be retrieved "F". The user can check the image content in detail when the user proceeds to the following screen.

During the above-described operation, a periphery of the thumbnail image 303 displayed in the window 308 is emphasized to associate the thumbnail image 303 with the thumbnail image displayed in the window 308 at the center of the selected image display view 311, as shown in FIGS. 7A to 7D. To make the association, other than emphasizing the periphery of the thumbnail image 303, the thumbnail image 303 can be emphasized by an ON/OFF display, namely the thumbnail image 303 being displayed and not displayed. Alternatively, the thumbnail image 303 can be erased and not erased by being colored. As a result of only the thumbnail image 303 corresponding to the displayed enlarged image being emphasized, a position of the currently displayed enlarged image in the sequence of the thumbnail list can be understood. Retrieval efficiency and productivity can be improved.

According to the first embodiment, the thumbnail images generated from sequentially correlated images are displayed in adherence to the sequential relation. A designated thumbnail image is displayed as an enlarged image. Progressive designation of the enlarged image in adherence to the sequential relation is performed. Therefore, a thumbnail image that is required to be enlarged is designated. As a result, the user can quickly and continuously perform retrieval while checking the contents of many thumbnail images without opening a separate window, such as a viewer. Operability can be improved.

Only pieces of data of the thumbnail images within the display area of the screen are transferred. Therefore, transfer time is reduced even for thumbnail images of a large size. Retrieval efficiency is improved.

Moreover, when an extremely large number of thumbnail images are displayed in the screen, thumbnail images of a size smaller than that ordinarily used can be used. Therefore, the transfer time in this instance is further reduced. Retrieval efficiency is improved.

In addition to the designated thumbnail image, enlarged images are generated for thumbnail images positioned before and after the designated thumbnail image based on the sequential relation. The designated thumbnail image and a predetermined number of thumbnail images positioned before and after the designated thumbnail image based on the sequential relation are displayed in adherence to the sequential relation. Therefore, the thumbnail images before and after the designated thumbnail image of interest can be simultaneously displayed. As a result, the images can be efficiently narrowed-down. Retrieval efficiency and productivity can be improved.

Next, a second embodiment of the present invention will be described with reference to FIGS. 8 to 11. Units that are the same as those according to the above-described first embodiment are given the same reference numbers. Explanations thereof are omitted.

According to the second embodiment, a thumbnail size (or resolution) and definition of the thumbnail image are changed depending on display magnification. Details are described hereafter.

Figures 8, 9:
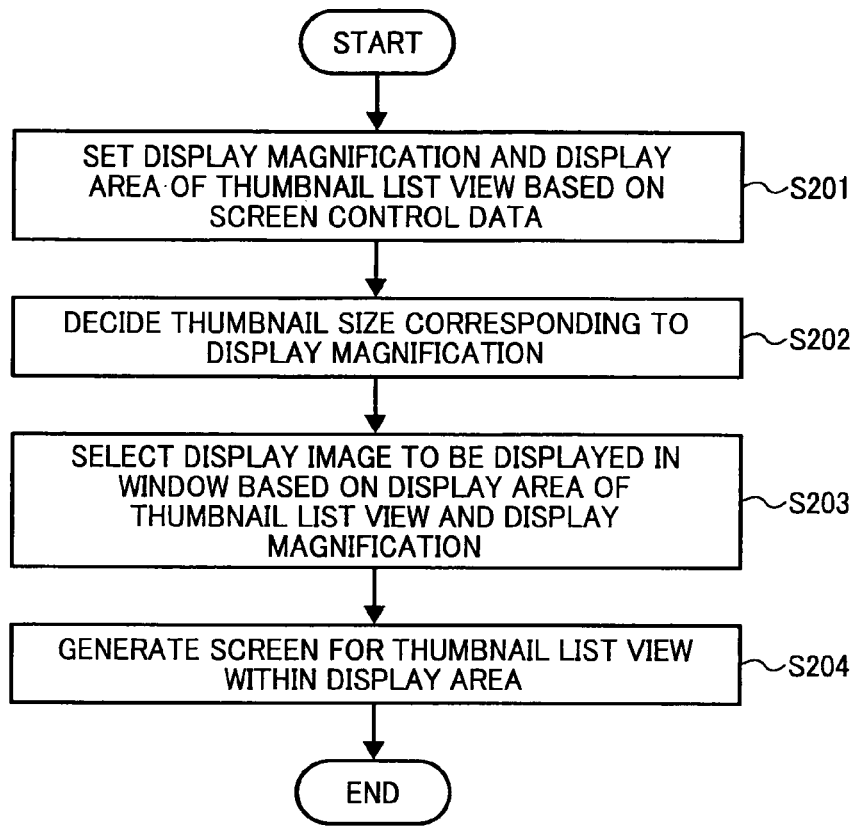
FIG. 8 is a flowchart of a process for generating a thumbnail list view according to a second embodiment of the present invention.
FIG. 9 is an explanatory diagram of a relationship between thumbnail images and sizes of long sides.

FIG. 8 is a flowchart of a process for generating the thumbnail list view 302 performed by the server device 110. At Step S201, when the screen control data 120 is input from the client device 100, the server device 110 sets the display magnification and the display area 312 of the thumbnail list view 302. In an initial setting screen, the server device 110 sets the display magnification and the display area 312 to predetermined values. To change the display magnification, the user operates the slider 304 for setting the display screen magnification and instructs that the display magnification be changed. The user operates the slider 304 using the input device 103, such as a mouse, in which a magnification specifying unit is realized.

At Step S202, the server device 110 sets a thumbnail size to be displayed based on the display magnification. In other words, the server device 110 sets the thumbnail size by setting a thumbnail type to be used in the thumbnail list view 302. According to the second embodiment, a plurality of thumbnail images having different sizes are generated for each registration image. A method of generating the thumbnail image is, for example, as follows. As shown in FIG. 9, a size of a long side is prescribed for each thumbnail image of a different size. When the size of the long side of an original image of the registration image 112 is greater than the prescribed size, the registration image 112 is reduced, thereby creating a thumbnail image having a long side with the prescribed length. A short side of the registration image 112 is reduced in proportion with the long side.

For example, when an image size of the input registration image 112 is 4000 pixels high and 2000 pixels wide, thumbnail images of seven different sizes, Sam1 to Sam7, are generated. The height of the thumbnail images Sam1 to Sam7 are as shown in FIG. 9. The width is half of the height. According to the second embodiment, an example is shown in which the image size of the thumbnail images is set based on size (pixel count). However, resolution can be changed.

For example, when the size of the long side of the thumbnail image corresponding to the display magnification is "40", a thumbnail image Sam1 in FIG. 9 is selected. Instead of selecting the display magnification, the user can directly specify the thumbnail size.

When the thumbnail size corresponding to the display magnification falls between values shown in FIG. 9, the thumbnail type can be selected based on a predetermined rule. For example, a thumbnail image of a thumbnail size closest to the corresponding thumbnail size can be selected. Alternatively, a thumbnail image of a thumbnail size smaller than the corresponding thumbnail size can be selected (thereby reducing amount of data transfer).

At Step S203, the thumbnail type corresponding to the image data included in the display area 312 of the thumbnail list view 302 is selected and decided.

At Step S204, a screen displayed in the display area 312 of the thumbnail list view 302 is generated based on the selected thumbnail type. Image data within the thumbnail list view 302 can be generated as bitmap data. However, in HTML, a method is commonly used in which the coordinate information and link information of the thumbnail images are written in a structured document. Therefore, the server device 110 is required to transfer the structured document and each piece of thumbnail image data within the display area 312 to the client device 100.

Figure 10A:
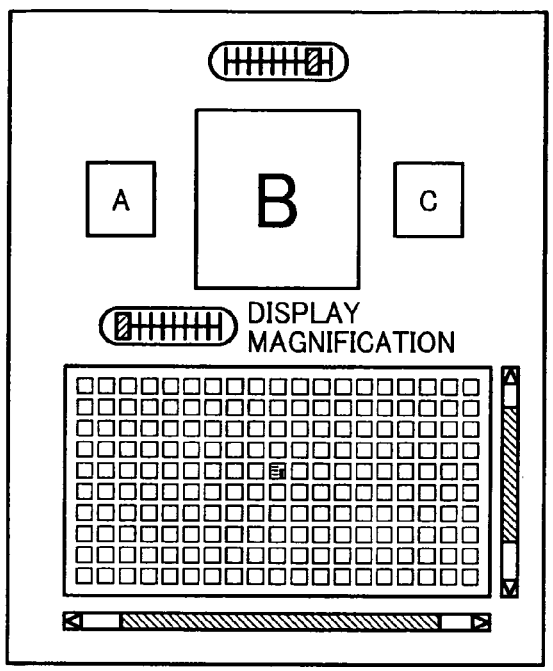
FIGS. 10A to 10D are front views of an example of a thumbnail list display screen.
Figure 10B:
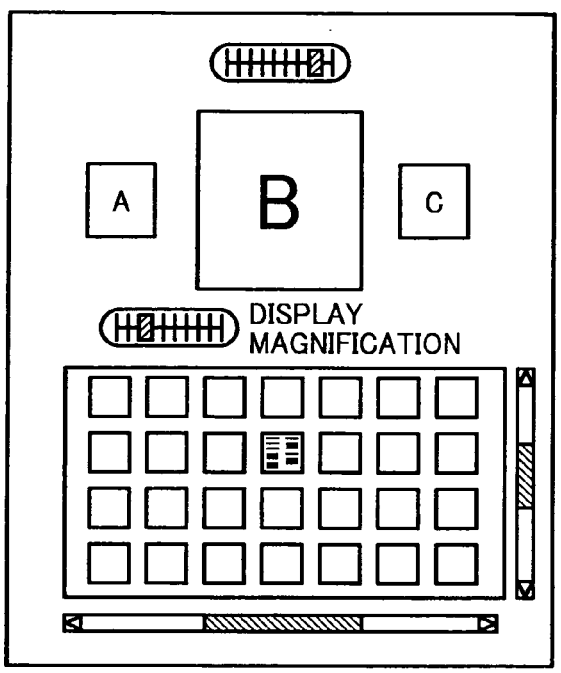
Figure 10C:
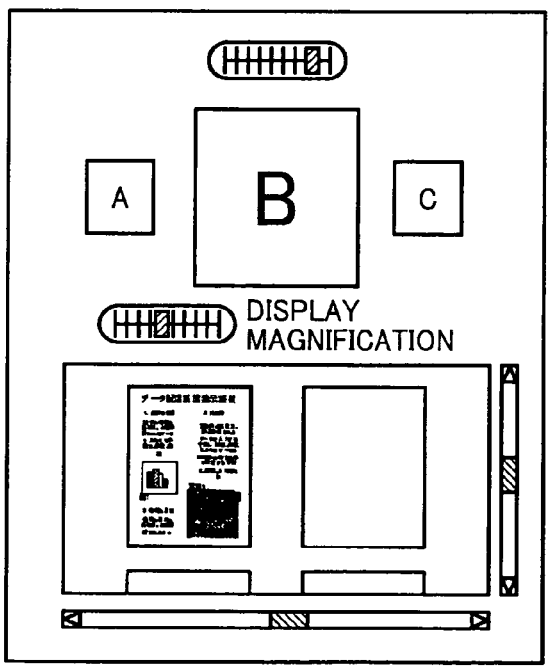
Figure 10D:
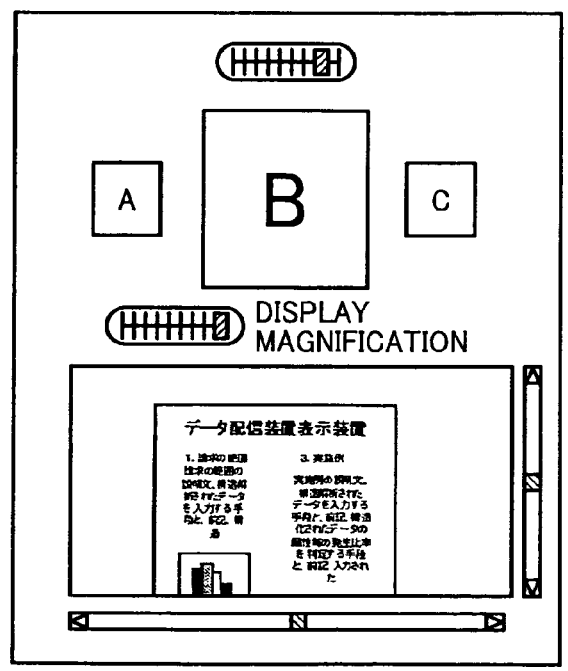

FIGS. 10A to 10D are diagrams of an example of an enlarged display displayed in the display device 101 of the client device 100. The user uses the slider 305 and the slider 306 to display the candidate image of the image to be retrieved from the thumbnail images in the center of the screen (FIG. 10A). During a course of gradually increasing an enlargement rate, the user checks whether the candidate image is the image to be retrieved while making comparisons with surrounding images and the like and checking the content of the image (FIGS. 10B and 10C). When the user confirms that the candidate image is not the image to be retrieved, the user reduces the display magnification and searches again for a candidate image. On the other hand, when the candidate image is the image to be retrieved, the user can check the image content in detail by increasing the display magnification of the screen of the thumbnail list view 302 (FIG. 10D).

For example, to simply enlarge an image, a conventional method of enlarging a single thumbnail image for each image can be used. However, in this method, a defined image cannot be obtained when an image that has once been reduced is enlarged. Therefore, text images and the like are difficult to read. FIG. 11A shows an enlarged image generated using the conventional method. FIG. 11B shows an image generated using the method of the present invention. When the thumbnail image is enlarged, the number of thumbnail images being displayed is reduced. Therefore, a restriction can be set to limit enlargement of the thumbnail image to a certain size.

According to the second embodiment, the display magnification of the thumbnail images is specified. The thumbnail images are generated by changing the size or the resolution based on the specified display magnification. Because the definition of the thumbnail images is changed, the contents of the thumbnail images can be checked without deterioration in the image quality, even when the enlargement rate is increased.

Next, a third embodiment of the present invention will be described with reference to FIGS. 12 to 14. Units that are the same as those according to the above-described first embodiment and second embodiment are given the same reference numbers. Explanations thereof are omitted.

According to the first embodiment, classification information of the images provided from an external source is used. However, according to the third embodiment, an image classification process is performed, and aspects of the classifications are displayed on the screen.

Figure 12:
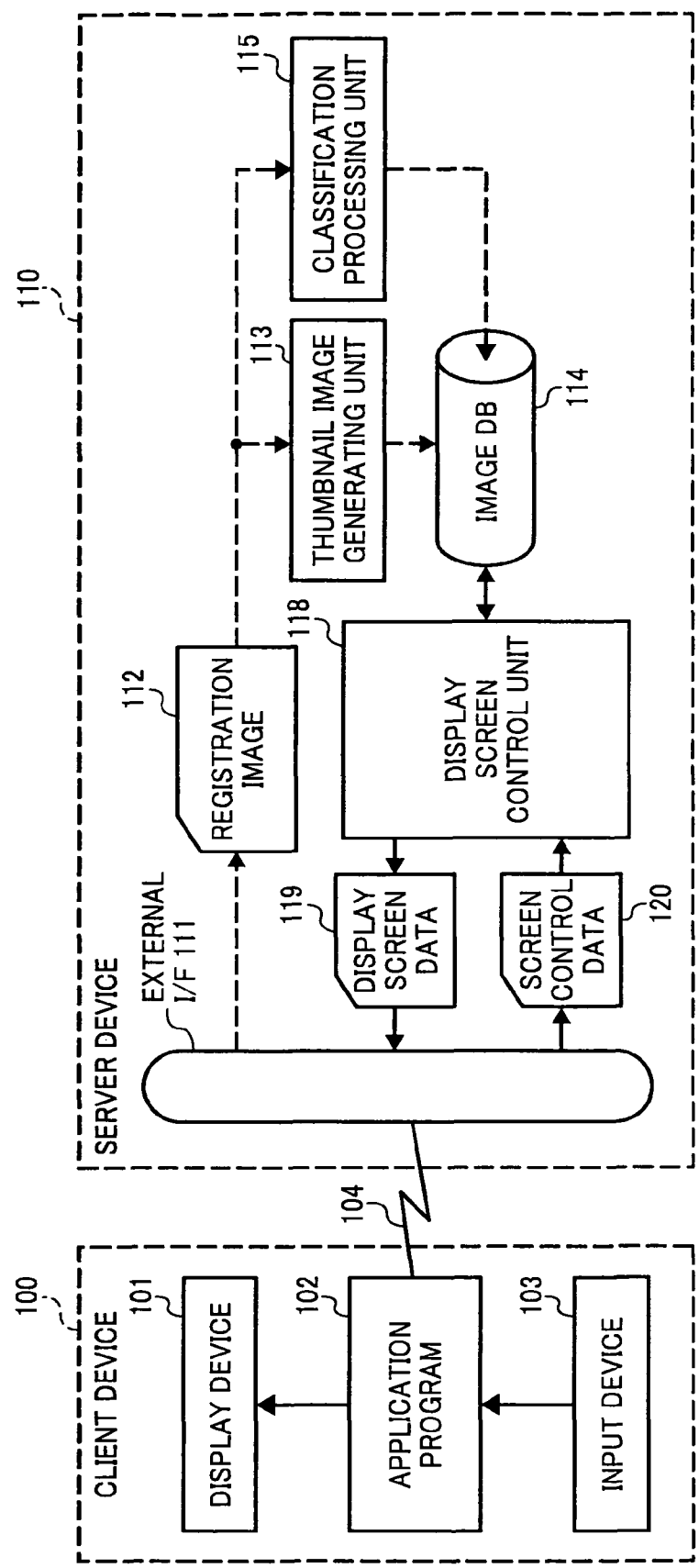
FIG. 12 is a block diagram of a configuration of a client-server system according to a third embodiment of the present invention.

FIG. 12 is a block diagram of a configuration of a client-server system according to the third embodiment. A reference number 115 indicates a classification processing unit that calculates feature quantity of an image and classifies the image into a predetermined category. Other constituent elements are similar to those according to the first embodiment. Explanations thereof are omitted.

Here, the classification process will be described. Various conventional technologies can be used for document image clustering and the classification process. Here, because the method used to perform the classification process is irrelevant, detailed explanations thereof are omitted. A preferred example of the classification process is, for example, described in Patent Application No. 2006-112912. In a classification processing method described in Patent Application No. 2006-112912, a plurality of feature quantities are calculated from a registration document image, and a plurality of category identifying processes described below are performed. Identified category types are color category identification, shape category identification, layout category identification, and document type identification. Here, a classifying unit is realized.

Figure 13:
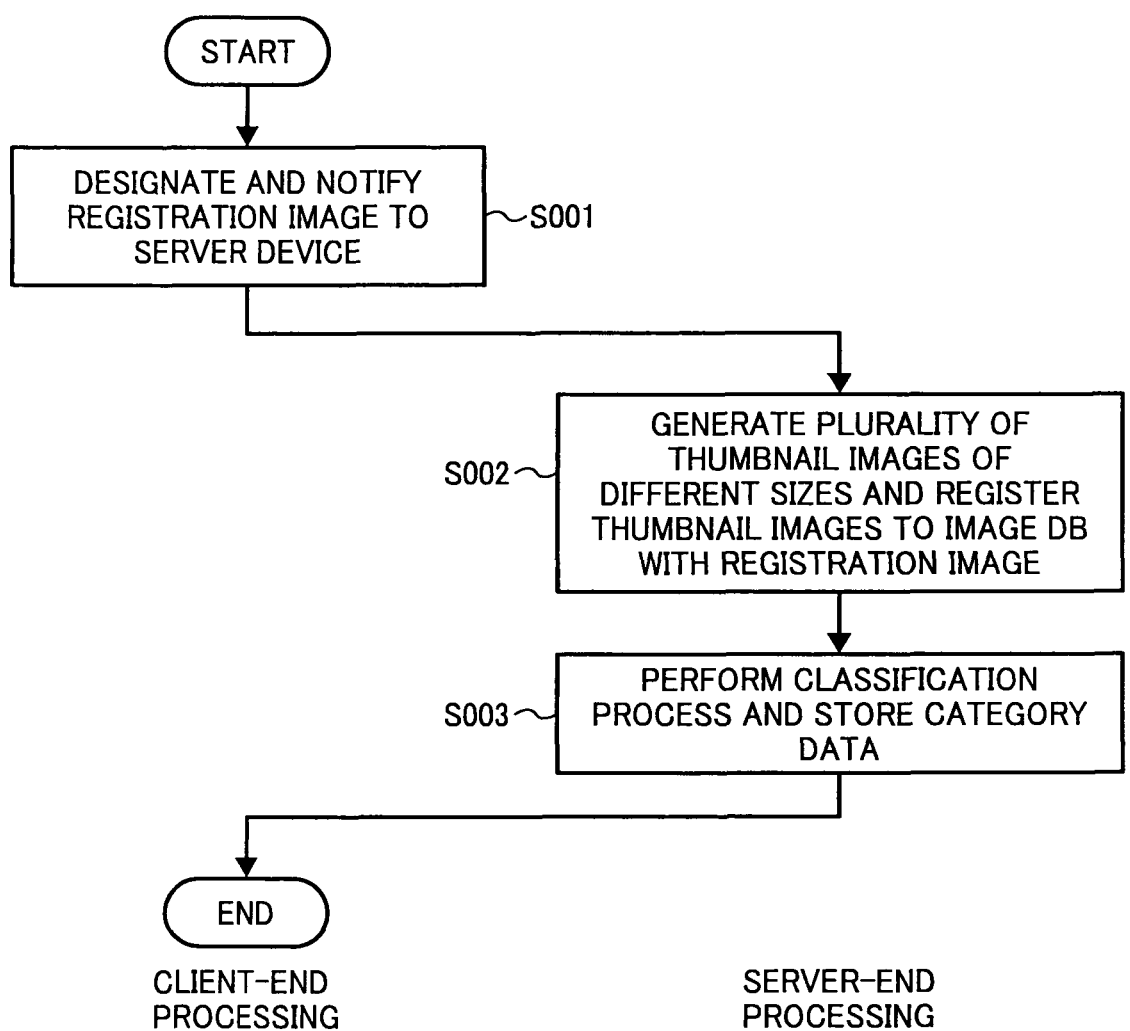
FIG. 13 is a flowchart of a process performed during image registration.

FIG. 13 is a flowchart of a process performed during image registration. At Step S001, the user instructs the server device 110 to register image data. The user issues the instruction from the client device 100 using the application program 102. The user also designates the registration image 112 to be registered.

At Step S002, the registration image 112 is input into the server device 110, via the external communication path 104. An ID and associated meta information, such as a file name, are added to the registration image 112, and the registration image 112 is registered to the image DB 114 via the external I/F 111. At the same time, the thumbnail image generating unit 113 generates a "thumbnail image" of a predetermined size or smaller by performing a reducing process on the registration image 112. The thumbnail image generating unit 113 then adds an ID to the thumbnail image and registers the thumbnail image to the image DB 114. When the registration image 112 includes a plurality of pages, a thumbnail image is generated in page units.

At subsequent Step S003, the "thumbnail image" is generated for the registration image 112, and the classification processing unit 115 performs the classification process. Each piece of category data is registered in the image DB 114 with other pieces of meta information.

In this way, a classification category set during image registration is used to dispose the thumbnail images in the thumbnail list view 302. An operational flow is similar to that according to the first embodiment. Explanation thereof is omitted. The thumbnail list view 302 according to the third embodiment will be described below.

Figure 14:
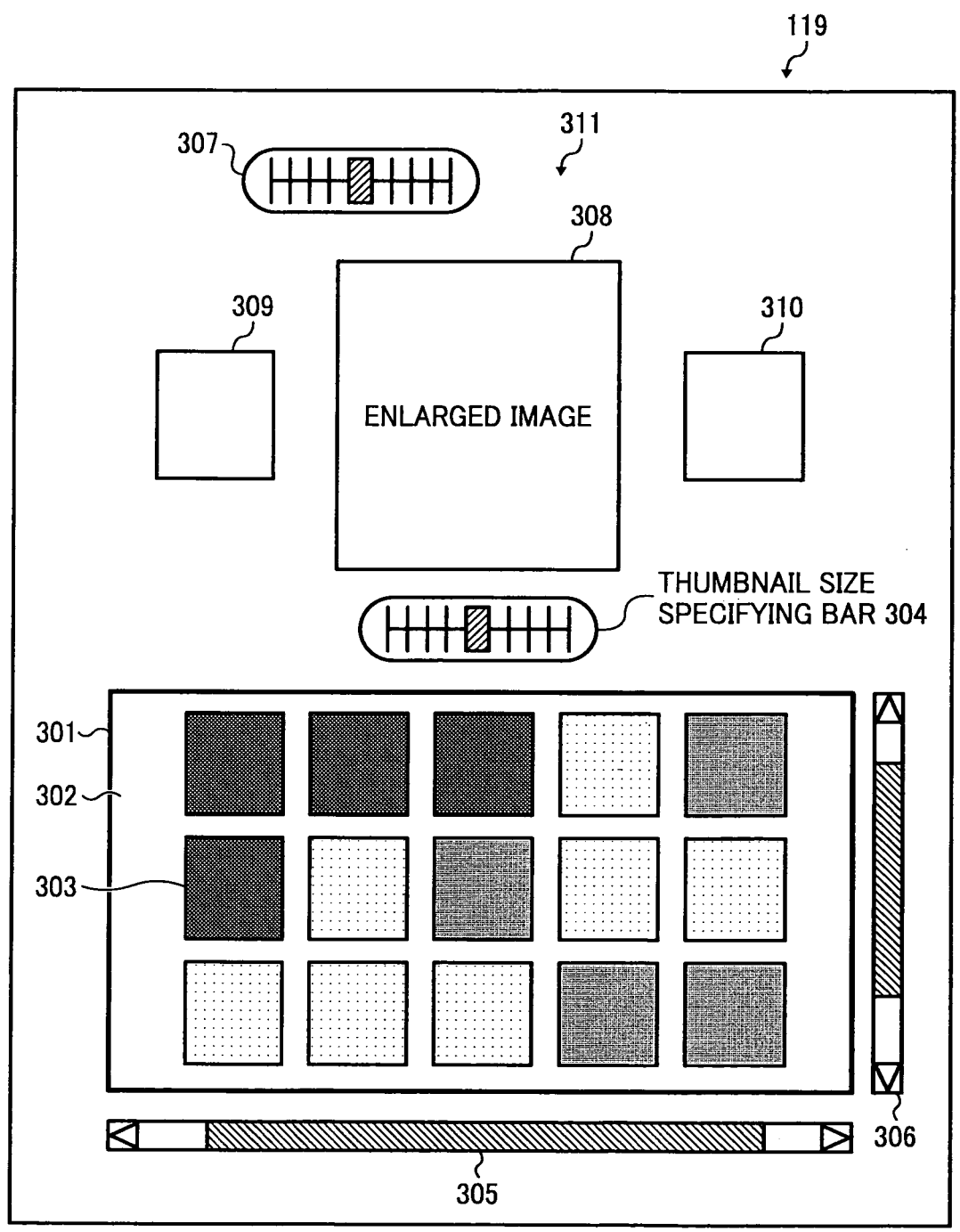
FIG. 14 is a front view of an example of a thumbnail list display screen.

FIG. 14 is a front view of an example of a thumbnail list display screen. In FIG. 14, the reference number 301 indicates the window restricting a display area of the thumbnail list view 302. The reference number 302 indicates the thumbnail list view that is a display frame for the thumbnail images. The reference number 303 indicates the individual thumbnail images (each square represents a thumbnail image). The reference number 304 is the slider used to set a display magnification of the thumbnail list view 302. The reference number 305 indicates the slider used to scroll the thumbnail list view 302 in a horizontal direction. The reference number 306 indicates the slider used to scroll the thumbnail list view 302 in a vertical direction. The reference number 311 is the selected image display view. The reference number 308 indicates the window configuring the selected image display view 311 and displays a currently selected image. The reference number 309 indicates the window configuring the selected image display view 311 and displays an image immediately preceding the currently selected image in the thumbnail list. The reference number 310 indicates a window configuring the selected image display view 311 and displays an image immediately following the currently selected image in the thumbnail list. The reference number 307 indicates the slider used to designate movement of an image to the selected image display view 311 to be displayed.

According to the third embodiment, a document classification process is performed on the thumbnail images 303 displayed in the thumbnail list view 302 during image registration. An aspect is shown in which the thumbnail images 303 are classified based on the category information. According to the third embodiment, classification based on a document page type is performed. Categorization based on color, shape, layout, and the like is performed. For example, color classification can be used in which the thumbnail images 303 are classified based on back ground color. The thumb nail images 303 can then be subdivided by layout classification and shape classification. Arrangement of the thumbnail images 303 in the thumbnail list view 302 such as this can be made by the display screen control unit 118 when an initial screen is generated at Step S102, as shown in the flowchart in FIG. 4. However, the classifications are preferably decided during image registration, and arrangement information (overview, color coding, and the like of the thumbnail images) are preferably held. As a result, processing time required until the thumbnail images 303 are displayed can be shortened.

When the aspects of classifications such as these are expressed by a large number of thumbnail images, the thumbnail images cannot fit on one screen when the number of thumbnail images increases, if a thumbnail size is fixed. In this case, images can be quasi-expressed by points, colors, pixel density, and the like, instead of using thumbnail images, to prevent all images from not being displayed on the initial screen.

Retrieval using browsing display can also be considered. In browsing display, the image in the window 308 in the center of the selected image display view 311 is successively switched using the slider 307. In this case, a long display time can be assigned when images belonging to an initially selected classification and classifications similar to the selected classification are displayed, using the classification information. The display time can be adjusted manually. When the user positions a bar at an end portion of the slider 307, the image being displayed can be switched more quickly. When the user positions the bar towards a center of the slider 307, the image being displayed can be switched more slowly.

Moreover, regarding images having different display times as described above, the images with a shorter display time can be a rough image, namely an image having a lower resolution than an image with a longer display time. Alternatively, the image can have lower image quality than the image with a longer display time. As a result, the amount of image data transferred between the server device 110 and the client device 100 can be reduced as the display time becomes shorter. Data transfer can be performed more efficiently, and high-speed browsing display can be achieved. Retrieval efficiency and productivity can be improved.

According to the third embodiment, the thumbnail images are classified using classification information. Classifications are made based on the feature quantities of the images. The thumbnail images are displayed in a manner allowing identification of the classifications. As a result, because a first sample image to be enlarged can be quickly identified even when an extremely large number of thumbnail images are present, thumbnail images of a size smaller than that ordinarily used can be used. The transfer time in such instances can be shortened. Productivity can be improved.

A long display time can be assigned when images belonging to a same classification as the classification of the designated thumbnail image and classifications similar to the classification of the designated thumbnail image are displayed, using the classification information. The enlarged image can be progressively designated based on the sequential relation. As a result, the enlarged image belonging to the same classification as the classification of the designated thumbnail image and classifications similar to the classification of the designated thumbnail image can be checked more easily. The images can be narrowed down more efficiently. Productivity can be improved.

Moreover, compared to enlarged images belonging to the same classification as the classification of the designated thumbnail image and classifications similar to the classification of the designated thumbnail image, other enlarged images can be generated to have lower image quality (or smaller image size) using the classification information. As a result, the amount of image data to be transferred can be reduced for images belonging to classifications differing from the classification of the designated thumbnail image. Data transfer can be performed more efficiently, and high-speed browsing display can be achieved. Retrieval efficiency and productivity can be improved.

Next, a fourth embodiment of the present invention will be described with reference to FIGS. 15 to 22. Units that are the same as those according to the first to third embodiments are given the same reference numbers. Explanations thereof are omitted.

According to the first embodiment, thumbnail images of one size are displayed. According to the second embodiment, a thumbnail size (or resolution) is changed depending on display magnification. According to the fourth embodiment, an original image is compressed by hierarchical coding, and the compressed image is held.

Figure 15:
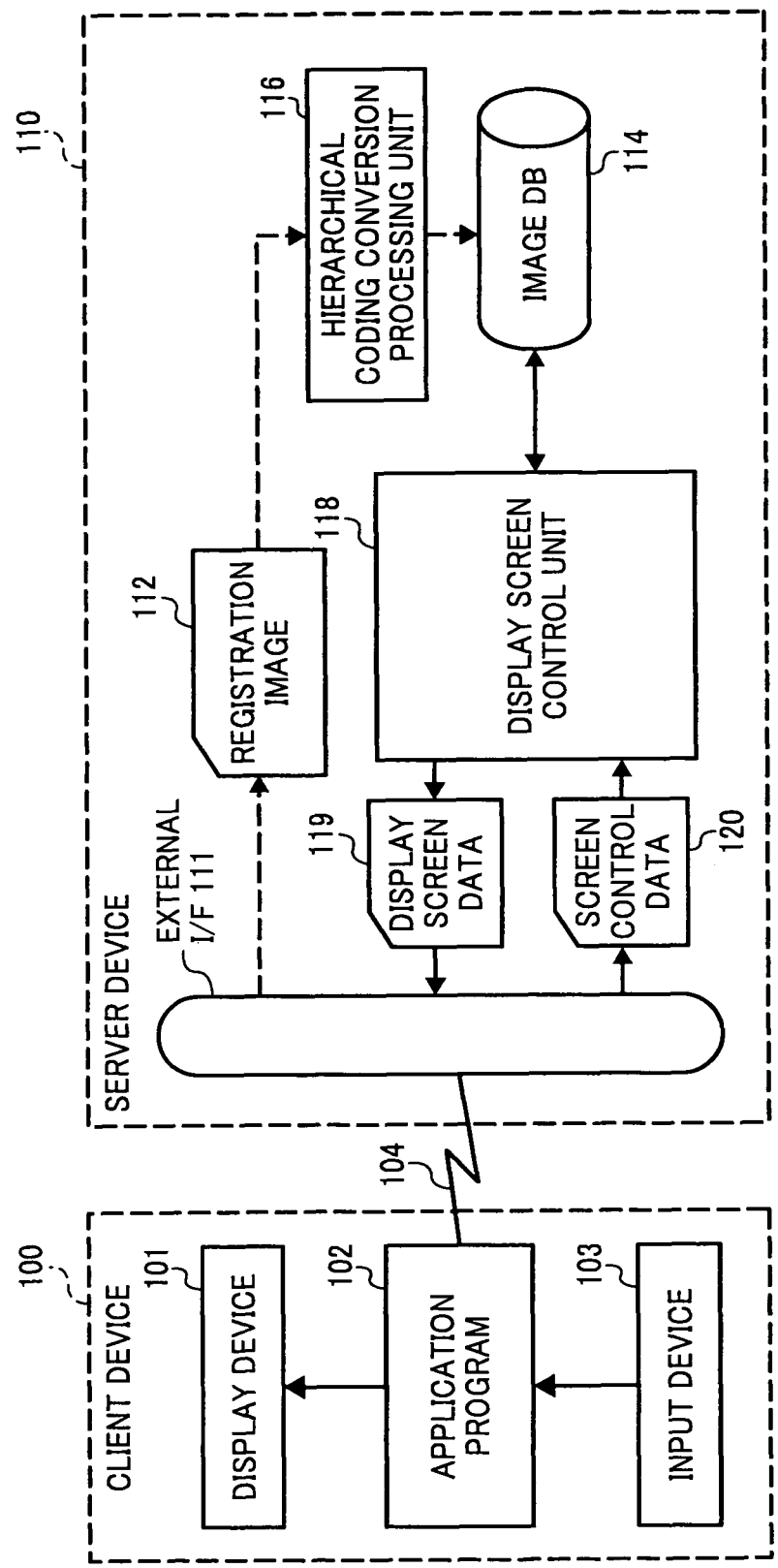
FIG. 15 is a block diagram of a configuration of a client-server system according to a fourth embodiment of the present invention.

FIG. 15 is a block diagram of a configuration of a client-server system according to the fourth embodiment. A reference number 116 indicates a hierarchical coding conversion processing unit that performs progressive coding on an input registration image. Other constituent elements are similar to those according to the first embodiment. Explanations thereof are omitted.

The hierarchical coding conversion processing unit 116 performs hierarchical coding on the input registration image 112. Ordinarily, a compression process is performed on image data. Therefore, the hierarchical coding conversion processing unit 116 performs hierarchical coding after decoding a compression code and decompressing the image data.

In the present invention, for example, a basic system of Joint Photographic Experts Group (JPEG) 2000 ([part 1] International Organization for Standardization [ISO] standard IS15444-1) is used as a hierarchical coding system. Hereafter, an overview of a coding system and progressive sequencing in JPEG2000 part 1 (referred to, hereinafter, as JPEG2000) will be described.

Figure 16:
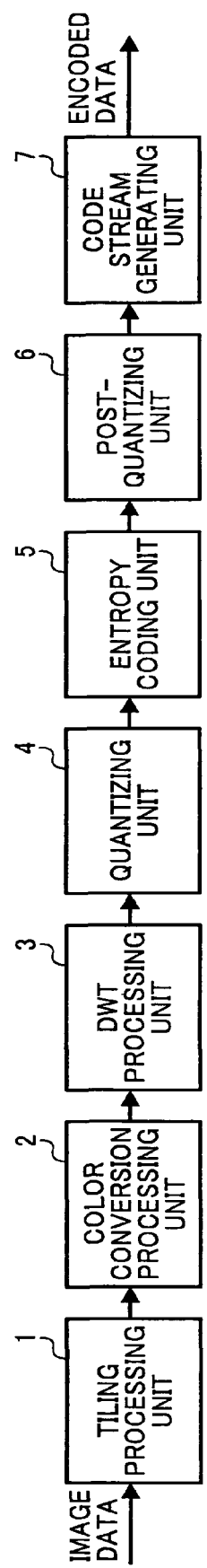
FIG. 16 is a block diagram of a compression coding process in JPEG2000.

FIG. 16 is a block diagram of a compression coding process in JPEG2000. An example will be described in which input image data are colors red, green, and blue (referred to, hereinafter, as RGB). The input RGB image data are input in rectangular block units called tiles by a tiling processing unit 1. When raster-format image data is input, the tiling processing unit 1 performs a raster-to-block conversion. The tiles in JPEG2000 can be encoded and decoded in individual tile units. When encoding and decoding are performed using hardware, an amount of hardware used can be reduced and decoding and display of only required tiles can be performed. Tiling is an option in JPEG2000. Tiling is arbitrarily performed. However, when tiling is not performed, a number of tiles is considered to be one.

Next, a color conversion processing unit 2 converts the image data to signals related to luminance and color difference. In JPEG2000, two types of color conversions are prescribed depending on a type of filter (two types: 5×3 and 9×7) used for discreet wavelet transform (DWT). When, for example, a reversible transform 5×3 filter is used, a reversible color conversion is performed using a following Equation 1.

$$Y = \left[\frac{R + 2G + B}{4}\right] \quad (1)$$
$$U = R - G$$
$$V = B - G$$

where [x] is a maximum integer that does not exceed x.

Before the above-described color conversion, a direct current (DC) level shift is performed for each red, green, and blue signal. The DC level shift when, for example, the input RGB signal is eight bits is shown in a following Equation 2.

$$R' = R - 128 \quad (2)$$

A DWT processing unit 3 performs the DWT on each component of the signal after color conversion is performed. A wavelet coefficient is output. The DWT is performed two-dimensionally. However, ordinarily, DWT is performed by convolution of a one-dimensional filter calculation using a calculation method called a lifting operation. A one-dimensional conversion formula is shown in a following Equation 3.

$$L(k) = x(2k) + \frac{H(k) + H(k+1)}{4} \quad (3)$$
$$H(k) = x(2k-1) - \frac{x(2k) + x(2k-2)}{2}$$

where L(k) is a low frequency component, H(k) is a high frequency component, and K is a coordinate.

The DWT is accompanied by down sampling. Therefore, resolutions of the above-described L(k) and H(k) are half that of the input image.

Figure 17:
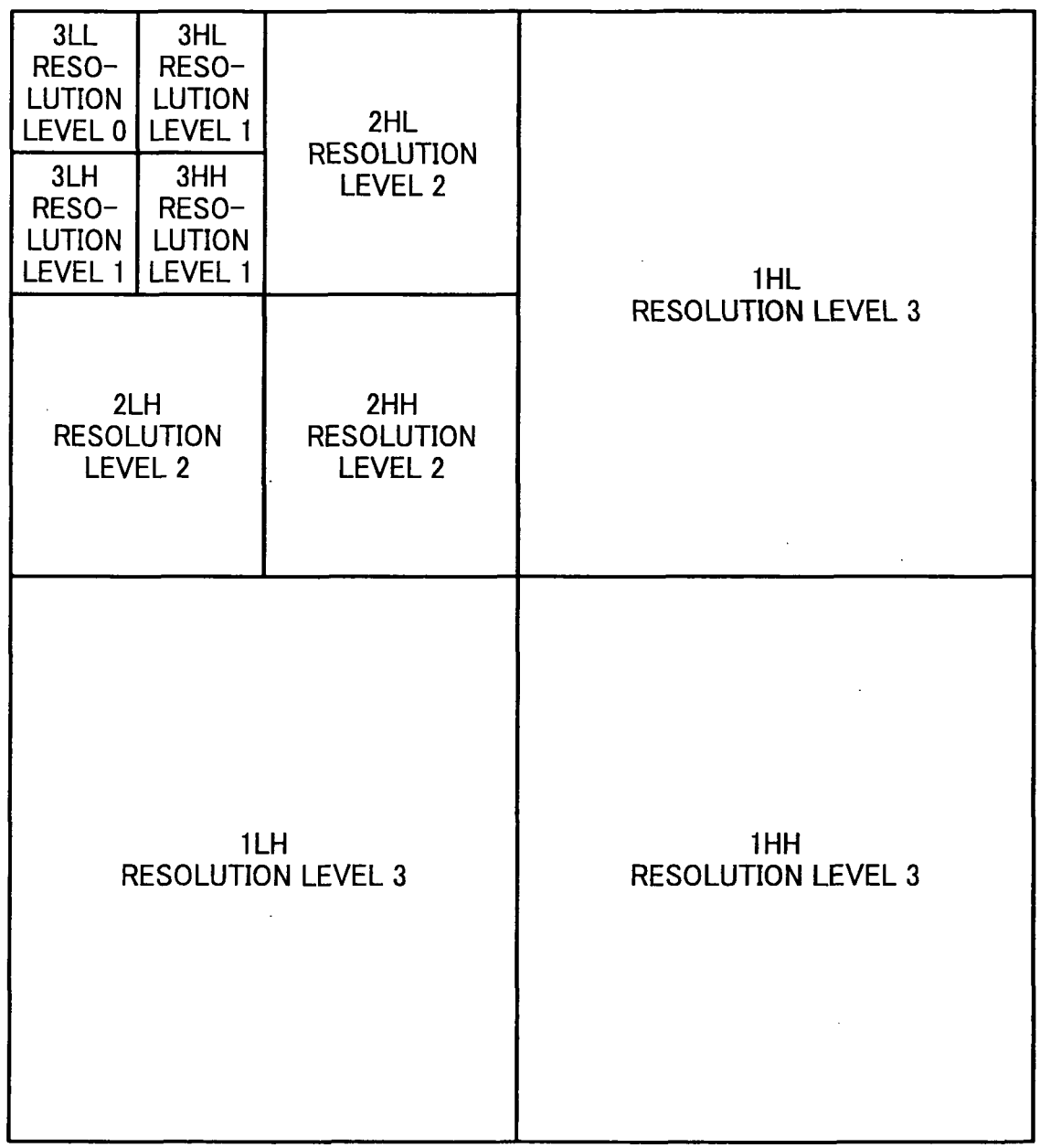
FIG. 17 is a schematic diagram of a wavelet coefficient divided into an octave.

FIG. 17 is a schematic diagram of the wavelet coefficient divided into an octave. In the DWT, four direction components referred to as sub-bands are output for each decomposition level 1. The four sub-bands are LL, HL, LH, and HH. As a result of the DWT being recursively performed on LL, the decomposition level is increased to a lower resolution. The coefficients of the decomposition level 1 with the highest resolution are expressed as 1HL, 1LH, and 1HH. Subsequent levels are expressed as 2HL, 2LH, and so on, to nHH. FIG. 17 is an example of a division into a decomposition level 3. At the same time, resolution levels are referred to as 0, 1, 2, and 3, starting from a coefficient with the lowest resolution, progressing in an opposite direction of the decomposition levels.

Figure 18:
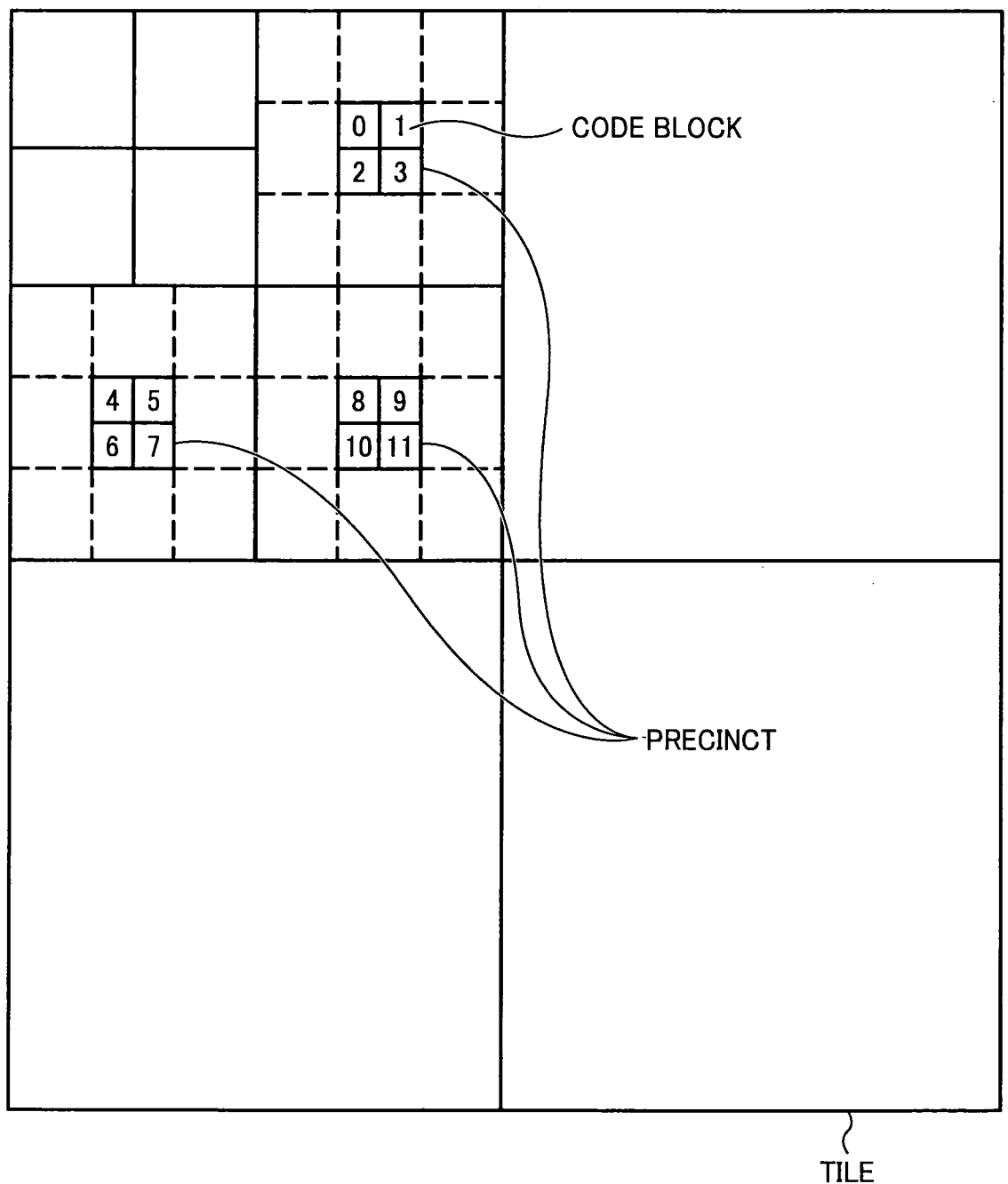
FIG. 18 is a schematic diagram of relationships among tiles, precincts, and code blocks associated with a wavelet coefficient of a tile.

The sub-band at each decomposition level can be divided into areas called precincts and a group of codes can be formed. Coding is performed in predetermined block units called code blocks. FIG. 18 is a schematic diagram of a relationship between tiles, precincts, and code blocks associated with the wavelet coefficient within a tile.

A quantizing unit 4 performs scalar quantization on the wavelet coefficient output from the DWT processing unit 3. However, when the reversible conversion is performed, the scalar quantization is not performed or the wavelet coefficient is quantized by "1". Effects similar to quantization can be achieved in a latter stage post-quantization. In the scalar quantization, parameters can be changed in tile units.

An entropy coding unit 5 performs entropy coding on the quantized data output from the quantizing unit 4. An entropy coding system in JPEG2000 divides the sub-band into rectangular areas referred to as code blocks (however, when a size of the sub-band is smaller than the code block, the sub-band is not divided) and encodes data in code block units.

Figure 19:
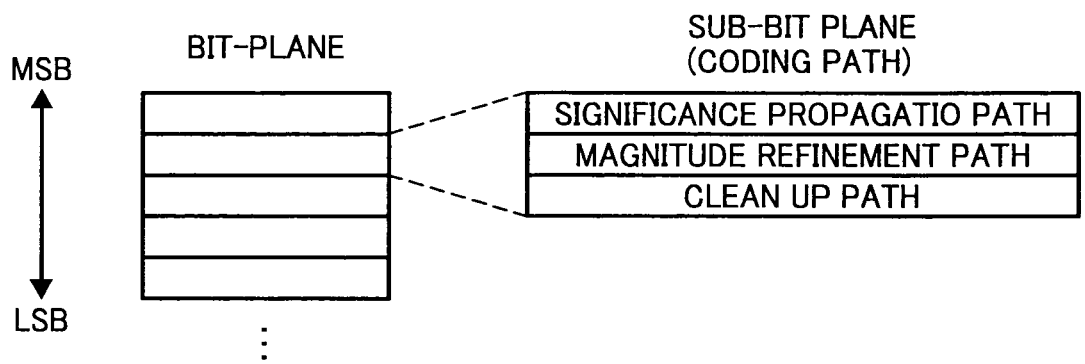
FIG. 19 is a schematic diagram of a relationship between a bit-plane and sub bit-planes.

After data within the code block are decomposed into bit planes as shown in FIG. 19, the bit-plane is divided into three paths (a significance propagation path, a magnitude refinement path, and a clean-up path) in adherence to a state indicating a degree of effect a conversion coefficient has on image quality. At each path, data is encoded by an arithmetic coding system referred to as an MQ coder. Significance (in terms of contribution to image quality) of the bit-plane increases towards a most significant bit (MSB) side. Significance of the coding paths increases in order of the significance propagation path, the magnitude refinement path, and the clean-up path. An end of each path is also referred to as a truncation point. The truncation point is a unit of code that can be truncated when the post-quantization is performed at the latter stage.

A post-quantizing unit 6 truncates the entropy-coded data as required. When a reversible code is required to be output, the post-quantization is not performed. Because an amount of codes can be truncated after encoding is performed, the JPEG2000 has a configuration (encoding of a single path) that does not require feedback to control the amount of codes. A code stream generation processing unit 7 rearranges the codes in the encoded data after post-quantization in adherence to a predetermined progressive sequence (decoding sequence for the encoded data) and adds a header. A code stream of a tile is completed.

Figure 20:
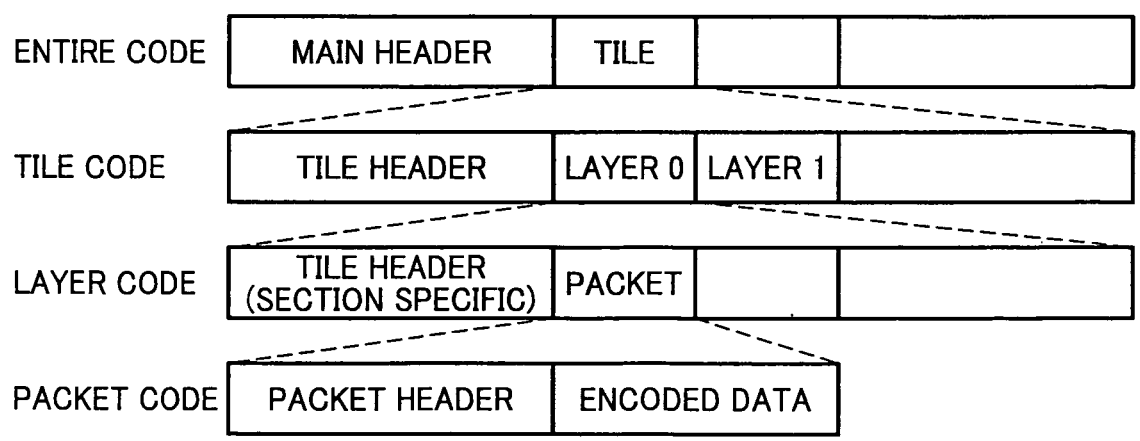
FIG. 20 is a schematic diagram of an overall code stream.

FIG. 20 is a schematic diagram of an overall code stream formed by a layer progression in JPEG2000. An entire code includes a plurality of tiles dividing a main header and the images. A tile code includes a plurality of layers. The layers are code units (described in detail hereafter) into which a tile header and codes within the tile are separated. The layers are sequentially aligned from low-order layers, such as layer 0, layer 1, and so on. A layer code includes a tile header for the layer and a plurality of packets. The packet includes a packet header and the encoded data. The packet is the smallest unit of the encoded data. The packet is formed by the encoded data of a single layer within a single precinct in a single resolution level (decomposition level), within a single tile component.

Next, the progressive sequence in the JPEG2000 will be described. In the JPEG2000, five progressions, described below, are prescribed by changes in priority among four image elements: image quality (layer [L]), resolution (R), component (C), and position (precinct [P]).

—LRCP Progression
Decoding is performed in order of precinct, component, resolution level, and layer. Therefore, the image quality of the overall image can be improved every time a layer index advances. An image quality progression can be realized. This progression is also referred to as a layer progression.

—RLCP Progression
Decoding is performed in order of precinct, component, layer, and resolution level. Therefore, a resolution progression can be realized.

—RPLC Progression
Decoding is performed in order of layer, component, precinct, and resolution level. Therefore, like RLCP, the progression is a resolution level progression. However, priority can be given to a certain position.

—PCRL Progression
Decoding is performed in order of layer, resolution level, component, and precinct. Therefore, priority is given to decoding of a certain portion. A spatial position progression can be realized.

—CPRL Progression
Decoding is performed in order of layer, resolution level, precinct, and component. For example, a component progression can be realized in which, when a color image is progressively decoded, a gray image can be reproduced first.

Figure 21A:
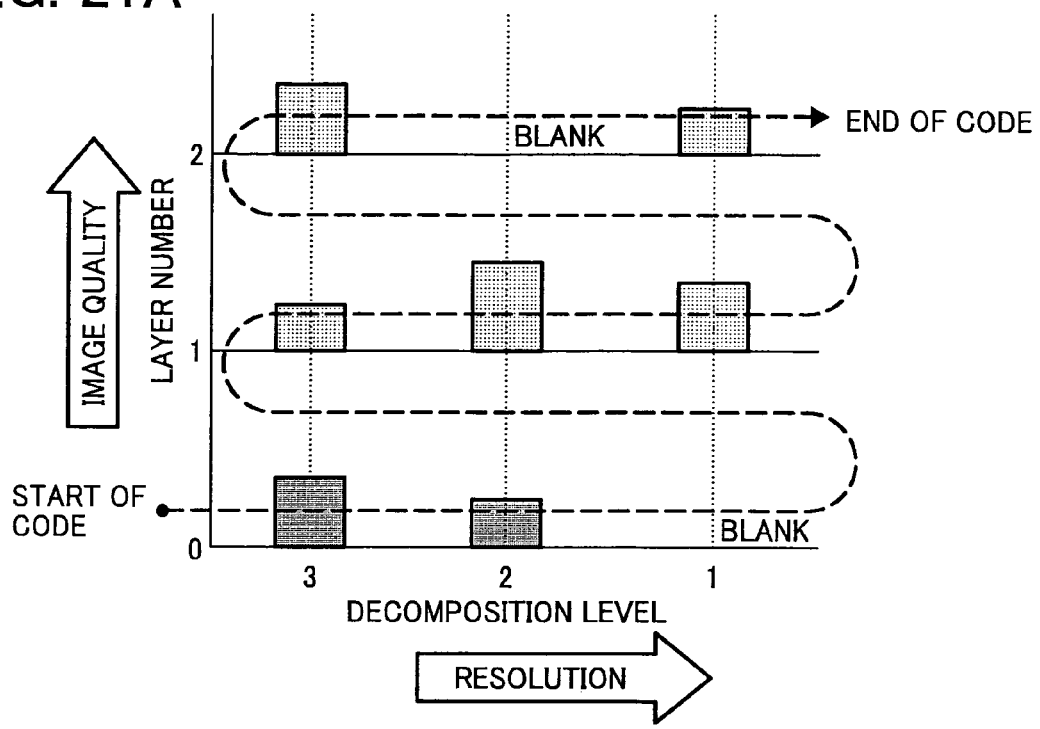
FIGS. 21A and 21B are schematic diagrams of coding sequences in layer progression and resolution progression.
Figure 21B:
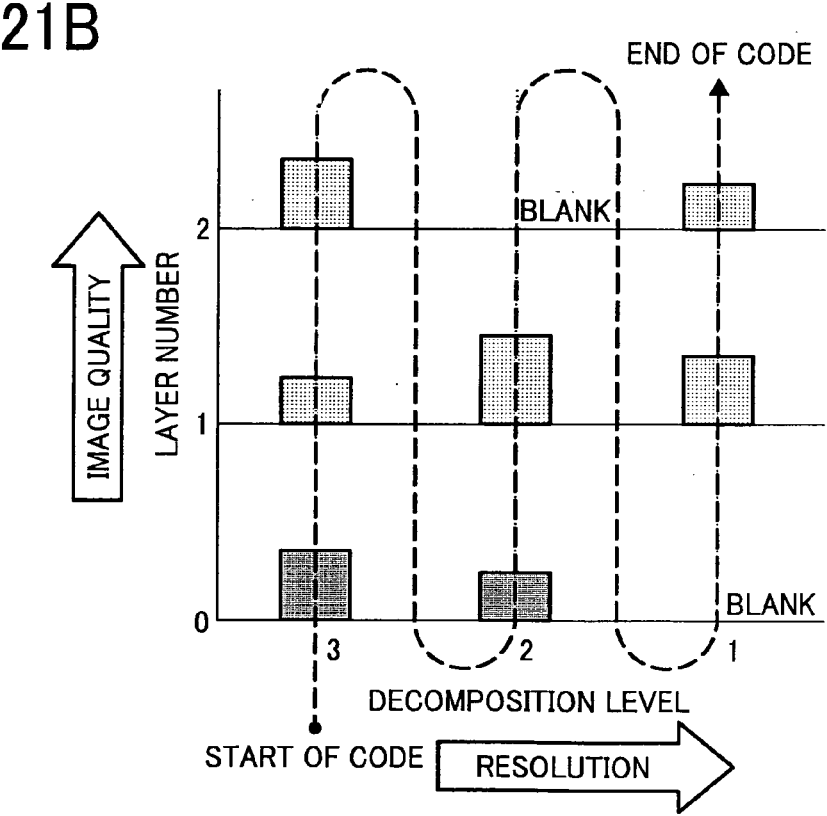

FIG. 21A is a schematic diagram of the progressive sequence of the LRCP progression (referred to, hereinafter, as the layer progression). FIG. 21B is a schematic diagram of the progressive sequence of the RLCP progression or the RPCL progression (referred to, hereinafter, as the resolution progression). In FIGS. 21A and 21B, a horizontal axis indicates the decomposition level (the higher the number is, the lower the resolution). A vertical axis indicates a layer number (the higher the number is, the higher the layer; a higher quality image can be reproduced by adding a high-order layer code to a low-order layer and decoding the data). Shaded rectangles indicate codes in association with the decomposition level and the layer. A size of the rectangle schematically indicates a proportion of the amount of the code. An arrow with a dotted line indicates an encoding sequence.

FIG. 21A shows the encoding sequence by which decoding is performed based on the layer progression. Decoding is performed on all resolutions of a same layer number. Decoding is then performed for a subsequent high-order layer. In terms of the wavelet coefficient, decoding is performed from a high-order bit of the coefficient. A progression in which the image quality gradually improves can be realized. FIG. 21B shows the encoding sequence in which decoding is performed based on the resolution progression. Decoding is performed on all layers of a same decomposition (resolution) level. Decoding is then performed for a subsequent decomposition (resolution) level. A progression in which the image quality gradually improves can be realized.

The image data is hierarchically coded using a hierarchical coding system represented by JPEG2000, and the encoded image data is held in the image DB 114. The thumbnail images can be generated based on the resolution level appropriate for the thumbnail image size. Therefore, a plurality of types of thumbnail images of different resolutions (sizes) can be generated from only the encoded data of an original image. The examples in FIGS. 21A and 21B have three tiers. However, in actuality, as a result of more tiers being provided, the amount of data transfer when a large number of thumbnail images are displayed within the display area 312 can be reduced. The number of tiers is decided as follows. The number of tiers (number of decomposition levels) is decided in correspondence with individual image sizes. An image size of when a resolution level 0 code is decoded is preferably roughly the same as the image size corresponding to the number of tiers.

Figure 22:
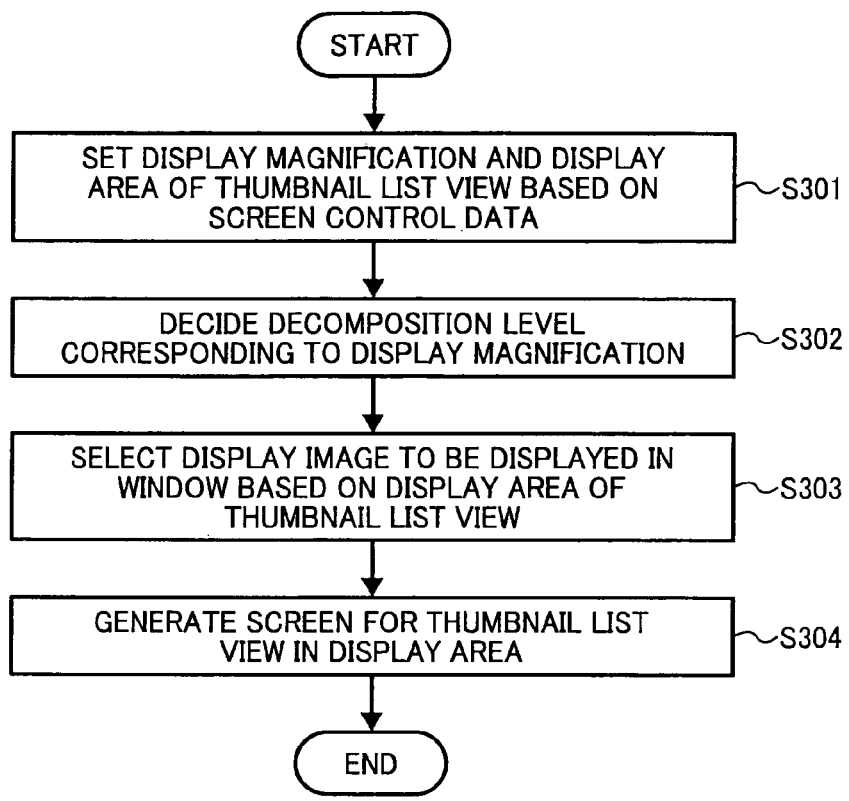
FIG. 22 is a flowchart of a process for generating a thumbnail list view.

FIG. 22 is a flowchart of a process for generating the thumbnail list view 302. A procedure performed at Step S301 is similar to the procedure performed at Step S201 in FIG. 8 according to the first embodiment. In other words, at Step S301, when the screen control data 120 is input from the client device 100, the server device 110 sets the display magnification and the display area 312 of the thumbnail list view 302. When an initial setting screen is generated, the server device 110 sets the display magnification and the display area 312 to predetermined values.

At Step S302, the server device 110 sets a resolution level used to display the thumbnail images 303, based on the display magnification. At Step S303, the server device 110 selects images corresponding to the image data included in the display area 312 of the thumbnail list view 302 and decides the images. At Step S304, the server device 110 generates the thumbnail images based on the resolution level of the selected pieces of image data and generates the screen to be displayed in the display area 312 of the thumbnail list view 302.

According to the fourth embodiment, an image format of the images is JPEG2000. The thumbnail images are generated using a hierarchical coding function based on JPEG2000. Therefore, instead of a plurality of thumbnail images of different sizes being generated, the images are hierarchically coded, and thumbnail images of different resolutions (sizes) are generated. As a result, because various processes can be performed with only the amount of encoded data of the original images, an amount of stored data can be reduced.

Next, a fifth embodiment of the present invention will be described with reference to FIGS. 23 and 24. Units that are the same as those according to the first to fourth embodiments are given the same reference numbers. Explanations thereof are omitted.

According to the fifth embodiment, an example is described in which processing speed is increased by encoded data being cached in the client device 100.

Figure 23:
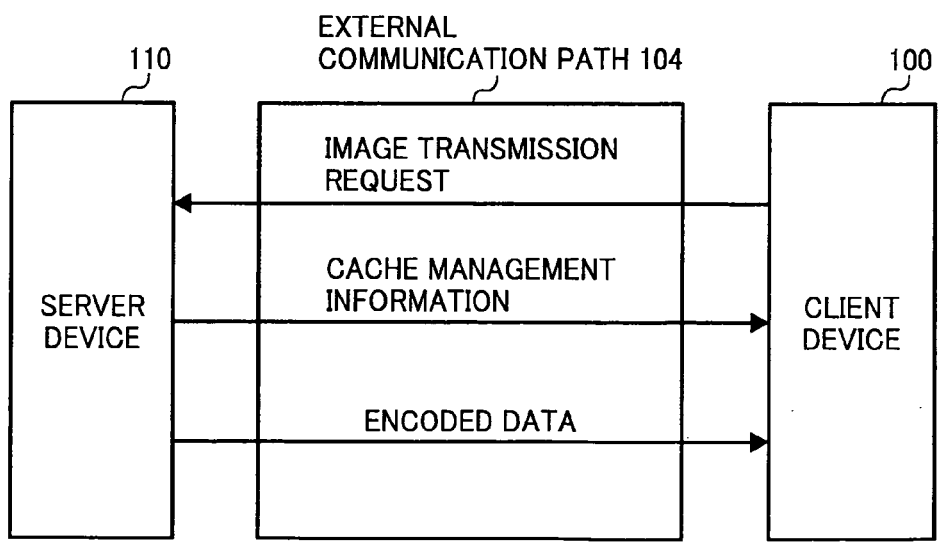
FIG. 23 is a schematic diagram of details of a flow of encoded image data between a server device and a client device according to a fifth embodiment of the present invention.

FIG. 23 is a schematic diagram of details of a flow of encoded image data between the server device 110 and the client device 100 according to the fifth embodiment. When the client device 100 transmits a request for image transmission to the server device 110, the server device 110 that receives the request for image transmission generates cache management information based on management information indicating an aspect of encoded data stored in the HDD 203 of the server device 110. The server device 110 then transmits the cache management information to the client device 100. The client device 100 generates cache management information based on the cache management information received from the server device 110. The cache management information generated by the client device 100 indicates portions of the encoded data that are cached and portions that are not cached. The client device 100 stores the cache management information in the HDD 203 of the client device 100. The server device 110 then transmits the encoded data to the client device 100. The client device 100 decodes the received encoded data and displays the decoded data in the display device 101. The client device 100 also caches the encoded data based on the cache management information.

Figure 24:
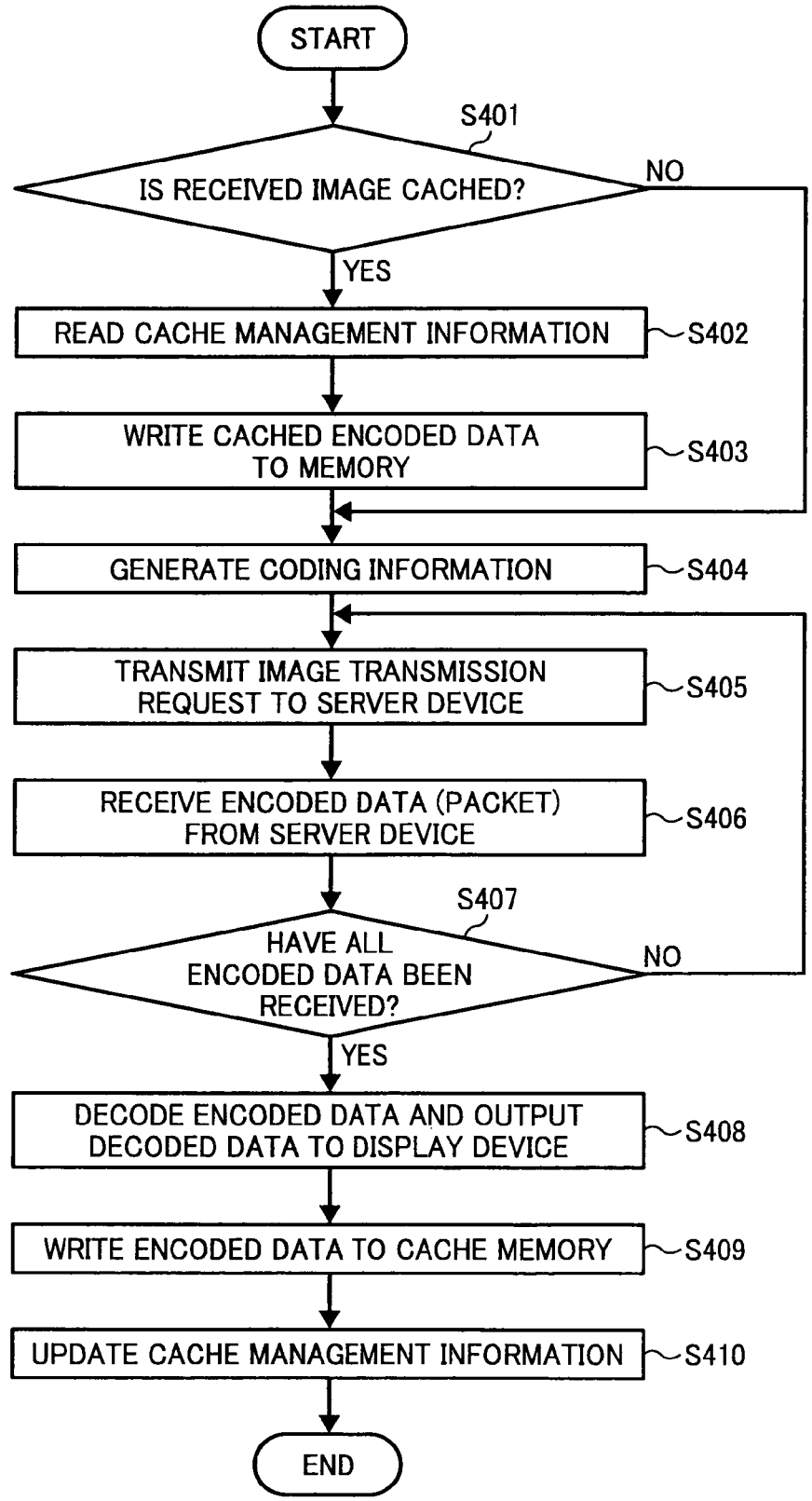
FIG. 24 is a flowchart of a process performed when the client device receives encoded data.

FIG. 24 is a flowchart of a process performed when the client device 100 receives the encoded data. The client device 100 first checks whether the received encoded data is cached (stored) in a cache area (referred to, hereinafter, as cache memory for simplicity) of the HDD 203 (Step S401).

When a desired encoded data is cached (Yes at Step S401), the client device 100 reads the cache management information of the corresponding encoded data stored in the HDD 203 to know which portion of the encoded data is cached and which portion is not cached (Step S402). The client device 100 then reads cached encoded data from the HDD 203 and writes the read cached encoded data to the memory 202 (Step S403). The client device 100 generates information on encoded data that is not cached, based on the cache management information (Step S404). In other words, the client device 100 sets encoded data that the client device 100 wishes to receive from the server device 110 as coding information. When no portion of the received encoded data is cached, the client device 100 sets all portions of the encoded data (as coding information on the encoded data the client device 100 wishes to received).

At subsequent Step S405, the client device 100 transmits the coding information generated at Step S404 to the server device 110 with the request for image transmission.

Then, the client device 100 receives encoded data (packet) from the server device 110 and temporarily stores the encoded data in the memory 202 (Step S406).

Procedures performed at Step S405 and Step S406 are repeated until all pieces of encoded data are received (Yes at Step S407).

When all pieces of encoded data is received (Yes at Step S407), the client device 100 successively decodes the pieces of encoded data temporarily stored in the memory 202. The client device 100 creates display image data and outputs the display image data to the display device 101 (Step S408).

When all pieces of encoded data are decoded and image data is displayed, the client device 100 writes the pieces of encoded data present in the memory 202 to the cache memory in the HDD 203 (Step S409). The client device 100 collates cache control information received from the server device 110 and the cache management information. The client device 100 updates the cache management information as required and stores the cache management information in the HDD 203 (Step S410). The process is then completed.

According to the fifth embodiment, the encoded data of an image is stored in the client device. Therefore, duplicate transfer of the encoded data can be prevented. As a result, an amount of data transfer during retrieval can be reduced. Transfer time can be shortened, and productivity can be improved.

When the hierarchically coded, compressed images of the original images are held as described according to the fourth embodiment, when a same image is gradually enlarged, display screens of thumbnail images of different sizes can be generated merely by additional codes being received, as a result of caching being performed at every tier. Efficiency further improved. Such information can be easily realized by caching unit in the cache management information being set smaller than coding tiers.

According to one aspect of the present invention, it is possible to perform a retrieval quickly and continuously while checking contents of a plurality of thumbnail images without opening a separate window, such as a viewer. Operability can be improved.

Furthermore, according to another aspect of the present invention, even when an extremely large number of thumbnail images are present, a sample image to be enlarged first can be quickly identified. Therefore, thumbnail images of a size smaller than that ordinarily used can be used. Transfer time in this instance can be reduced, and productivity can be improved.

Moreover, according to still another aspect of the present invention, the enlarged image belonging to the same classification as the classification of the designated thumbnail image and classifications similar to the classification of the designated thumbnail image can be checked more easily. The images can be narrowed down more efficiently. Productivity can be improved.

Furthermore, according to still another aspect of the present invention, the contents of the thumbnail images can be checked without deterioration in the image quality, even when the enlargement rate is increased.

Moreover, according to still another aspect of the present invention, instead of a plurality of thumbnail images of different sizes being generated, the images are hierarchically coded, and thumbnail images of different resolutions (sizes) are generated. As a result, because various processes can be performed with only the amount of encoded data of the original images, an amount of stored data can be reduced.

Furthermore, according to still another aspect of the present invention, a position of the displayed enlarged image in a thumbnail list sequence can be understood. Retrieval efficiency and productivity can be improved.

Moreover, according to still another aspect of the present invention, duplicate transfer of the encoded data can be prevented. As a result, an amount of data transfer during retrieval can be reduced. Transfer time can be shortened, and productivity can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information display system comprising:
   a thumbnail image generating unit that generates thumbnail images from a plurality of images having a sequential relation, the thumbnail image generating unit further generates thumbnails according to the thumbnail image displaying unit determination;
   a thumbnail image displaying unit of a server device that forwards a thumbnail list view of the thumbnail images of a first size generated according to the sequential relation to a display of a client device;
   a thumbnail image designating unit that receives a designation of a thumbnail image from among the thumbnail images;
   an enlarging unit that generates an enlarged image of a designated thumbnail image of a second size larger than the first size from the thumbnail list view and enlarged images of thumbnail images positioned before and after the enlarged designated thumbnail image in the thumbnail list view based on the sequential relation, the enlarged images of thumbnail images positioned before and after the enlarged designated thumbnail image being fully viewable and having a size smaller than a size of the enlarged image of the designated thumbnail image and larger than the first size;
   an enlarged image displaying unit that displays the enlarged images and a plurality of enlarged thumbnail images from among the enlarged designated thumbnail image and the enlarged thumbnail images positioned before and after the enlarged designated thumbnail image according to the sequential relation;
   a forward-advance designating unit that designates a forward advance of the enlarged image displayed by the enlarged image displaying unit according to the sequential relation;
   the client device caches encoded data related to the thumbnail list view of the generated thumbnail images, the client device being configured to receive, from the server device, when the enlarged images are to be displayed at the display of the client device, additional encoded data of the enlarged images to be displayed at the client device; and
   a classifying unit that classifies the thumbnail images based on pieces of classification information of the images obtained from outside, wherein
      the thumbnail image displaying unit displays the thumbnail images in such a manner that classifications of the thumbnail images can be identified, wherein
      the thumbnail image designating unit is configured to select a thumbnail image that is required to be enlarged as a result of a designation of the forward advance according to the sequential relation by the forward-advance designating unit as the designated thumbnail image, and wherein
      the forward-advance designating unit assigns a longer display time when displaying an enlarged image belonging to a same classification as a classification of the designated thumbnail image, than when displaying an enlarged image belonging to a different classification than the classification of the designated thumbnail image based on the classification information.

2. The information display system according to claim 1, further comprising:
   a classifying unit that classifies the thumbnail images based on pieces of classification information for classifying the images based on a characteristic of each of the images, wherein
   the thumbnail image displaying unit displays the thumbnail images in such a manner that classifications of the thumbnail images can be identified.

3. The information display system according to claim 1, wherein the enlarging unit generates an enlarged image of another thumbnail image with lower image quality than an enlarged image belonging to a same classification as a classification of the designated thumbnail image and a classification similar to the classification of the designated thumbnail image based on the classification information.

4. The information display system according to claim 1, wherein the enlarging unit generates an enlarged image of another thumbnail image with a smaller image size than an enlarged image belonging to a same classification as a classification of the designated thumbnail image and a classification similar to the classification of the designated thumbnail image based on the classification information.

5. The information display system according to claim 1, further comprising:
   a magnification specifying unit that receives a specification of a display magnification of the thumbnail list view, wherein
   the thumbnail image generating unit generates the thumbnail image by at least one of changing size and resolution based on the display magnification.

6. The information display system according to claim 1, wherein
   the server device is connected to the client device via an external communication path, the server device including an image database that stores therein the images and the thumbnail images, and wherein
   the client device stores encoded data of the images and management information stating which portion of the encoded data is stored and which portion of the encoded data is not stored, generates information on the encoded data that is not stored based on the management information, and transmits a request for transmission of the images including the information on the encoded data, and the server device receiving the request for transmission transmits the encoded data based on the information on the encoded data included in the request for transmission to the client device.

7. A method of displaying information in an information display system, the method comprising: thumbnail image generating including, generating thumbnail images in a thumbnail list view from a plurality of images having a sequential relation, and generating thumbnail images according to the thumbnail image displaying unit determining; thumbnail image displaying including displaying the thumbnail images a first size generated in the thumbnail list view according to the sequential relation; thumbnail image designating including receiving a designation of a thumbnail image from among the thumbnail images; enlarging the thumbnail images including generating an enlarged image of a designated thumbnail image of a second size larger than the first size from the thumbnail list view, and generating enlarged images of thumbnail images from the thumbnail list view positioned before and after the enlarged designated thumbnail image, based on the sequential relation, having a size smaller than a size of the enlarged designated thumbnail image and larger than the first size; enlarged image displaying including, displaying a plurality of fully viewable enlarged thumbnail images from among the enlarged designated thumbnail image and the enlarged thumbnail images positioned before and after the designated thumbnail image according to the sequential relation; forward-advance designating including designating a forward advance of the enlarged image displayed at the enlarged image displaying unit according to the sequential relation; and caching, by a client device, encoded data related to a thumbnail list view of the generated thumbnail images, the client device being configured to receive, from a server device, when the enlarged images are to be displayed, additional encoded data of the enlarged images to be displayed on a display of the client device; and a classifying unit that classifies the thumbnail images based on pieces of classification information of the images obtained from outside, wherein the thumbnail image displaying unit displays the thumbnail images in such a manner that classifications of the thumbnail images can be identified, wherein the thumbnail image designating further includes selecting a thumbnail image that is required to be enlarged as a result of a designation of the forward advance according to the sequential relation at the forward-advance designating as the designated thumbnail image, and wherein the forward-advance designating unit assigns a longer display time when displaying an enlarged image belonging to a same classification as a classification of the designated thumbnail image, than when displaying an enlarged image belonging to a different classification than the classification of the designated thumbnail image based on the classification information.

8. The method according to claim 7, further comprising: classifying the thumbnail images based on pieces of classification information for classifying the images based on a characteristic of the images, wherein the thumbnail image displaying further includes displaying the thumbnail images in such a manner that classifications of the thumbnail images can be identified.

9. The method according to claim 7, wherein the enlarging further includes generating an enlarged image of another thumbnail image with lower image quality than an enlarged image belonging to a same classification as a classification of the designated thumbnail image and a classification similar to the classification of the designated thumbnail image based on the classification information.

10. The method according to claim 7, wherein the enlarging further includes generating an enlarged image of another thumbnail image with a smaller image size than an enlarged image belonging to a same classification as a classification of the designated thumbnail image and a classification similar to the classification of the designated thumbnail image based on the classification information.

11. The method according to claim 7, further comprising: magnification specifying including receiving a specification of a display magnification of the thumbnail image, wherein the thumbnail image generating further includes generating the thumbnail image by changing size or resolution based on the display magnification.

12. The method according to claim 7, further comprising: storing the images and the thumbnail images by a database of the server device connected to the client device via an external communication path, storing by the client device, encoded data of the images and management information stating which portion of the encoded data is stored and which portion of the encoded data is not stored;

generating by the client device, information on the encoded data that is not stored based on the management information;

transmitting, by the client device, a request for transmission of the images including the information on the encoded data; and transmitting by the server device that receives the request for transmission, the encoded data based on the information on the encoded data included in the request for transmission to the client device.

13. A non-transitory computer program product comprising a computer-usable medium having computer-readable program codes embodied in the medium that when executed cause a computer to execute:

thumbnail image generating including, generating thumbnail images a first size in a thumbnail list view from a plurality of images having a sequential relation, and generating thumbnails according to the thumbnail image displaying unit determining;

thumbnail image displaying including displaying the thumbnail images generated in the thumbnail list view according to the sequential relation;

thumbnail image designating including receiving a designation of a thumbnail image from among the thumbnail images; enlarging thumbnail images including generating an enlarged image of a designated thumbnail image of a second size larger than the first size from the thumbnail list view, and generating enlarged images of thumbnail images from the thumbnail list view positioned before and after the enlarged designated thumbnail image based on the sequential relation having a size smaller than a size of the enlarged image of the designated thumbnail image and larger than the first size;

enlarged image displaying including displaying a plurality of fully viewable enlarged thumbnail images from among the enlarged designated thumbnail image and the enlarged thumbnail images positioned before and after the enlarged designated thumbnail image according to the sequential relation; forward-advance designating including designating a forward advance of the enlarged image displayed at the enlarged image displaying according to the sequential relation; and caching, by a client device, encoded data related to a thumbnail list view of the generated thumbnail images, the client device being configured to receive, from a server device, when the enlarged images are to be displayed, additional encoded data of the enlarged images to be displayed on a display of the client device; and a classifying unit that classifies the thumbnail images based on pieces of classification information of the images obtained from outside, wherein the thumbnail image displaying unit displays the thumbnail images in such a manner that classifications of the thumbnail images can be identified, wherein the thumbnail image designating further includes selecting a thumbnail image that is required to be enlarged as a result of a designation of the forward advance according to the sequential relation at the forward-advance designating as the designated thumbnail image, and wherein the forward-advance designating unit assigns a longer display time when displaying an enlarged image belonging to a same classification as a classification of the designated thumbnail image, than when displaying an enlarged image belonging to a different classification than the classification of the designated thumbnail image based on the classification information.

14. The information display system according to claim 1, further comprising:
   a scrolling unit configured to scroll the thumbnail list view in at least one of a horizontal and a vertical direction.

15. The method according to claim 7, further comprising:
   scrolling the thumbnail list view in at least one of a horizontal and a vertical direction.

16. The non-transitory computer program product according to claim 13, wherein the computer-readable program codes embodied in the medium further cause a computer to execute:
   scrolling the thumbnail list view in at least one of a horizontal and a vertical direction.

* * * * *